United States Patent
Hojo et al.

(10) Patent No.: US 7,691,513 B2
(45) Date of Patent: Apr. 6, 2010

(54) PROTON CONDUCTOR, ELECTROLYTE MEMBRANE, ELECTRODE AND FUEL CELL

(75) Inventors: Nobuhiko Hojo, Osaka (JP); Junji Niikura, Osaka (JP); Taisuke Yamamoto, Nara (JP)

(73) Assignee: Panasonic Corporation, Osaka (JP)

( * ) Notice: Subject to any disclaimer, the term of this patent is extended or adjusted under 35 U.S.C. 154(b) by 851 days.

(21) Appl. No.: 10/590,270

(22) PCT Filed: Apr. 13, 2005

(86) PCT No.: PCT/JP2005/007117

§ 371 (c)(1),
(2), (4) Date: Aug. 22, 2006

(87) PCT Pub. No.: WO2005/101428

PCT Pub. Date: Oct. 27, 2005

(65) Prior Publication Data
US 2007/0202373 A1    Aug. 30, 2007

(30) Foreign Application Priority Data
Apr. 13, 2004  (JP) ............................. 2004-117587

(51) Int. Cl.
H01M 8/10    (2006.01)
(52) U.S. Cl. .............................. 429/33; 429/309; 521/27
(58) Field of Classification Search .................. 429/33, 429/309; 521/27
See application file for complete search history.

(56) References Cited

U.S. PATENT DOCUMENTS

| | | | | |
|---|---|---|---|---|
| 6,264,857 B1 * | 7/2001 | Kreuer et al. | ............... | 252/500 |
| 6,977,234 B2 | 12/2005 | Kosako et al. | | |
| 2002/0127474 A1 * | 9/2002 | Fleischer et al. | ............ | 429/309 |

FOREIGN PATENT DOCUMENTS

| | | |
|---|---|---|
| EP | 1 278 260 A1 | 1/2003 |
| EP | 1 345 280 A1 | 9/2003 |
| JP | 2001-236973 A | 8/2001 |
| JP | 2002-246041 | 8/2002 |
| JP | 2002-246041 A | 8/2002 |
| JP | 2003-257453 A | 9/2003 |
| JP | 2003-263999 A | 9/2003 |
| WO | WO 96/13872 | 5/1996 |
| WO | WO 01/94450 A2 | 6/2001 |

OTHER PUBLICATIONS

Chinese Office Action issued in Chinese Patent Application No. CN 2005800086336, dated Dec. 26, 2008.

* cited by examiner

*Primary Examiner*—Jane Rhee
(74) *Attorney, Agent, or Firm*—McDermott Will & Emery LLP

(57) ABSTRACT

A proton conductor comprises a base material, an acidic substance and a basic substance, wherein the acidic substance has protons; at least part of the protons are dissociated by the basic substance; and at least one of the acidic and basic substances is immobilized on a surface of the base material. At least part of the acidic substance and/or at least part of the basic substance may be a polymer. A powder or a porous body having pores or through-holes can be used as the base material. An organic compound having a hydrophilic part and a hydrophobic part in the molecule can be used as the at least one of the acidic and basic substances.

18 Claims, 9 Drawing Sheets

(a)

(b)

(a)

(b)

PROTON CONDUCTOR, ELECTROLYTE MEMBRANE, ELECTRODE AND FUEL CELL

RELATED APPLICATIONS

This application is the U.S. National Phase under 35 U.S.C. 0371 of International Application No. PCT/JP2005/007117, filed on Apr. 13, 2005, which in turn claims the benefit of Japanese Application No. 2004-117587, filed on Apr. 13, 2004, the disclosures of which Applications are incorporated by reference herein.

TECHNICAL FIELD

The present invention relates to a proton conductor, and an electrolyte membrane, an electrode, a fuel cell and the like using the same, and particularly to a proton conductor having improved chemical stability and ion conductivity in a high temperature (for example, from 100° C. to 200° C.) and low humidity environment.

BACKGROUND ART

In recent years, there have been developed polymer electrolyte fuel cells which can be operated in a temperature range of from ordinary temperature to around 80° C. by using as an electrolyte membrane a polymer electrolyte membrane which is a proton conductor. Polymer electrolyte fuel cells have a wide variety of applications such as power generation systems for domestic power supply, distributed power supply and the like, cogeneration systems combining the above power generation systems with waste heat recovery technology, power supply for driving mobile bodies such as automobiles, and power supply for mobile terminals of electronic equipment and the like.

In order to commercialize polymer electrolyte fuel cells, higher output is desired. Increase of the operation temperature of fuel cells, specifically to 100° C. to 200° C., is considered to be effective for this purpose, because increase of operation temperature can increase the efficiency of power generation of the cells and improve the output of the fuel cells.

Polymers typically used as a proton conductor for polymer electrolyte fuel cells at present are fluorocarbon polymers having a strong acid functional group in a side chain, that is, perfluorosulfonic acid polymers. Among them, Nafion® manufactured by EI du Pont de Nemours and Company is the most typical one. Perfluorosulfonic acid polymers have the advantage that, by humidification, they have a very high proton conductivity of around $10^{-1}$ S/cm in a temperature range of from ordinary temperature to 100° C.

However, perfluorosulfonic acid polymers have the disadvantage that their proton conductivity is greatly reduced at a temperature of 100° C. or more. Therefore, it is impossible to use them in a high temperature environment. Perfluorosulfonic acid polymers retain water by humidification, and this water forms an ion-conducting path. Proton conductivity is greatly reduced because the water forming the ion-conducting path is evaporated at a temperature of 100° C. or more.

In order to solve the problem as described above, use of a basic polymer doped with a strong acid as a proton conductor is disclosed (for example, refer to Patent Document 1). This proton conductor is a basic polymer such as polybenzimidazole doped with a strong acid in liquid form such as sulfuric acid or phosphoric acid.

Patent Document 1 describes the "doping" as follows. When basic polymers are doped with strong acids, the strong acids are dissociated into protons and acid anions. The basic polymers receive protons dissociated from the acids and are protonated. The protonated basic polymers form acid-base bonding with the acid anions. The thus formed proton conductors exhibit a high proton conductivity of $10^{-2}$ S/cm or more in a temperature range of from 100° C. to 200° C. even under low humidity.

However, since the proton conductor described in Patent Document 1 is obtained by "doping" a basic polymer with an acidic substance, the bonding strength between the basic polymer and the acidic substance is not necessarily sufficient. Therefore, there is a problem that the proton conductivity is prone to be reduced due to the elimination of the acidic substance from the proton conductor. It is likely that the performance of the fuel cells using a proton conductor as described above is prone to be reduced (for example, refer to Non-Patent Document 1).

Moreover, there is proposed a proton conductor obtained by impregnating an acidic polymer (or a basic polymer) with a basic polymer (or an acidic polymer) so as to form acid-base bonding (for example, refer to Patent Document 2). It is described that this proton conductor exhibits a proton conductivity of from $10^{-3}$ to $10^{-2}$ S/cm at 150° C. in a low-humidity condition (in a nitrogen stream). It is likely that the reduction of proton conductivity due to the elimination of acid or base is alleviated since both the acid and base are polymers in the proton conductor described in Patent Document 2.

However, the proton conductor described in Patent Document 2 has a problem that its proton conductivity does not attain a practical level in a temperature range of from 100 to 200° C. This may be due to the fact that, since both the acidic and basic substances are polymers, it is impossible to sufficiently increase the content of the acidic substance or the basic substance in the proton conductor. Generally, the mechanical strength and chemical stability of the polymer containing an acidic or a basic functional group are reduced as the amount of the functional group is increased.

An electrolyte membrane may be prepared from a proton conductor having a low mechanical strength, but problems such as breakage may occur since the strength of the membrane is weak. Further, when chemical stability of a proton conductor is reduced, problems such as elution of polymers at a high temperature or dissolution thereof in water may become conspicuous. Furthermore, there is also a problem that the type of polymers that can maintain heat resistance is limited in a temperature range of from 100 to 200° C.

Moreover, there is also disclosed a proton conductor containing an acidic polymer, a basic polymer and an elastic polymer (for example, refer to Patent Document 3). By incorporating an elastic polymer, it is possible to obtain a proton conductor having an increased mechanical strength compared to a proton conductor consisting only of an acidic polymer and a basic polymer.

However, although the proton conductor described in Patent Document 3 improves mechanical strength, it does not alleviate the reduction of chemical stability. From the viewpoint of maintaining chemical stability, the amount of an acidic substance or a basic substance contained in the proton conductor cannot sufficiently be increased. The result is that the proton conductivity in a temperature range of from 100 to 200° C. also may not attain a sufficiently high level.

[Patent Document 1]: National Publication of International Patent Application No. 1999-503262

[Patent Document 2]: Japanese Patent Laid-Open No. 2001-236973

[Patent Document 3]: National Publication of International Patent Application No. 2003-535940
[Non-Patent Document 1]: Electrochemistry, Vol. 70, No. 12, p. 943-945 (2002)

DISCLOSURE OF INVENTION

Problem that the Invention is to be Solve

As described above, proton conductor which exhibit high ion conductivity even at high temperature and low humidity are desired in various fields including fuel cells. For example, in order to make it possible to improve the efficiency of power generation of fuel cells and further increase the output thereof, it is very effective to improve the performance of proton conductors. Specifically, the development of proton conductors which stably exhibit high ion conductivity in a temperature range of from 100° C. to 200° C. even under low humidity is desired. However, proton conductors which are chemically stable and exhibit high ion conductivity at high temperature and low humidity are not yet obtained in spite of numerous efforts which have been made.

The present invention provides a proton conductor which is chemically stable and exhibits high ion conductivity in a temperature range of from 100° C. to 200° C. even under low humidity. That is, the present invention relates to a proton conductor comprising a base material, an acidic substance and a basic substance, wherein the acidic substance has protons; at least part of the protons are dissociated by the basic substance; and at least one of the acidic and basic substances is immobilized on a surface of the base material.

In the present invention, the acidic and basic substances correspond to acid and base according to the definition by Broensted, respectively. Thus, the acidic substance is a substance which produces protons by dissociation and the basic substance is a substance which receives protons. The acidity (pKa) between the acidic and basic substances is different, that is, a substance having higher acidity becomes the acidic substance and that having lower acidity becomes the basic substance. Incidentally, all of the protons of the acidic substance may be dissociated by the basic substance, or only part of the protons may be dissociated by the basic substance. Typically, almost all or all protons are probably dissociated by the basic substance.

In the present invention, at least one of the acidic and basic substances may be immobilized on a surface of a base material in any form, but it is typically immobilized by a covalent bond. For example, the present invention includes the case where the acidic substance is immobilized on a surface of a base material by a covalent bond, the case where the basic substance is immobilized on a surface of a base material by a covalent bond, and the case where both of the acidic and basic substances are immobilized on a surface of a base material by a covalent bond.

The base material of the present invention is a carrier for immobilizing at least one of the acidic and basic substances and the form of the base material is not particularly limited. The base material may be in the form of, for example, powder, granules, particulates, films, sheets or the like.

When the proton conductor of the present invention is used, for example, for an electrolyte membrane, it is required that a non-electron conductive material be used as the base material. When the proton conductor of the present invention is used, for example, by containing it in an electrode, an electron conductive material may be used as the base material, or a non-electron conductive material may be used as the base material.

The proton conductor of the present invention may contain various polymers as a binder. Moreover, at least one of the acidic and basic substances may be a polymer. It is possible to improve the stability of the proton conductor in water by using a polymer. Further, in the present invention, since at least one of the acidic and basic substances is immobilized on a surface of the base material, the reduction of chemical stability of the proton conductor is suppressed. Consequently, the proportion of the basic substance to the acidic substance or the proportion of the acidic substance to the basic substance is not restricted, and it is possible to obtain a proton conductor having high ion conductivity.

From the viewpoint of maximizing ion conductivity, the surface area of the base material is preferably increased. The base material having a large surface area includes, for example, particulates and porous bodies. It is possible to control the performance of the proton conductor in various ways by controlling the particle size, surface area or the like of particulates and the pore size or the like of porous bodies.

Preferably, in the present invention, at least part of the acidic substance, and/or at least part of the basic substance (that is, at least part of the at least one of the acidic and basic substances) is a polymer, and the base material is retained in a matrix of the above-described polymer. Here, the matrix of the polymer refers to a network structure formed by physical or chemical crosslinking of polymer resins.

The proton conductors in the form as described above include, for example, the followings:

(a1) A proton conductor, wherein at least part of an acidic substance is a polymer; a basic substance is immobilized on a surface of a base material; and the above-described base material is retained in a matrix formed by the above-described polymer.

(a2) A proton conductor, wherein at least part of an acidic substance is a polymer; an acidic and basic substances are immobilized on a surface of a base material; and the above-described base material is retained in a matrix formed by the above-described polymer.

(b1) A proton conductor, wherein at least part of a basic substance is a polymer; an acidic substance is immobilized on a surface of a base material; and the above-described base material is retained in a matrix formed by the above-described polymer.

(b2) A proton conductor, wherein at least part of a basic substance is a polymer; an acidic and basic substances are immobilized on a surface of a base material; and the above-described base material is retained in a matrix formed by the above-described polymer.

(c1) A proton conductor, wherein at least part of an acidic substance and at least part of a basic substance are each a polymer; a basic substance is immobilized on a surface of a base material; and the above-described base material is retained in a matrix formed by the above-described polymer.

(c2) A proton conductor, wherein at least part of an acidic substance and at least part of a basic substance are each a polymer; an acidic substance is immobilized on a surface of the base material; and the above-described base material is retained in a matrix formed by the above-described polymer.

(c3) A proton conductor, wherein at least part of an acidic substance and at least part of a basic substance are each a polymer; an acidic and basic substances are immobilized on a surface of a base material; and the above-described base material is retained in a matrix formed by the above-described polymer.

In the present invention, when both of an acidic and basic substances are immobilized on a surface of a base material, the acidic and basic substances may be immobilized on the same base material, or the base material on which the acidic substance is immobilized may be combined with the base material on which the basic substance is immobilized, by mixing or the like.

When both of an acidic and basic substances are immobilized on a surface of a base material, the base material on which the acidic and basic substances are immobilized need not necessarily be retained in the matrix formed by the polymer of the acidic substance or of the basic substance. When protons of the acidic substance are in the state of being dissociated by the basic substance, the base material immobilizing the acidic and basic substances may be used as a proton conductor as it is, or it may be formed for use in particular applications. Moreover, it is also possible to use, as a proton conductor, the base material on which the acidic and basic substances are immobilized by retaining it in a matrix formed by a neutral polymer having substantially no acidity or basicity.

The base material is preferably a porous body having pores or through-holes. That is, at least one of the acidic and basic substances is contained in the pores or through-holes of the porous body which is the base material. The proton conductors in the form as described above include, for example, the followings:

(d1) A proton conductor, wherein at least part of an acidic substance is immobilized on the inner wall of pores or through-holes of a porous body. In this case, from the viewpoint of dissociating protons of the acidic substance by the basic substance, the basic substance is also preferably contained in the pores or through-holes.

(d2) A proton conductor, wherein at least part of a basic substance is immobilized on the inner wall of pores or through-holes of a porous body. In this case, from the viewpoint of dissociating protons of the acidic substance by the basic substance, the acidic substance is also preferably contained in the pores or through-holes.

(d3) A proton conductor, wherein at least part of an acidic substance and at least part of a basic substance are immobilized on the inner wall of pores or through-holes of a porous body.

In the present invention, the acidic and basic substances are not particularly limited, as long as they correspond to acid and base according to the definition by Broensted, respectively. For example, an organic compound having a hydrophilic and a hydrophobic part may preferably be used. The organic compound having a hydrophilic and a hydrophobic part in the molecule is suitable particularly when the base material is a porous body, and the most suitable when the porous body has through-holes.

The organic compound having a hydrophilic and a hydrophobic part in the molecule can form a built-up film (monomolecular built-up film), that is, a Langmuir-Blodgett film (LB film) in pores or through-holes. Formation of the built-up film makes it possible to form a greater number of ion-conducting paths. From the viewpoint of forming a good built-up film, both of the acidic and basic substances are preferably organic compounds each having a hydrophilic and a hydrophobic part in the molecule. The proton conductors in the form as described above include, for example, the following proton conductors which comprise a first layer and a second layer. The number of build-up is not particularly limited, and the following embodiment may have a third layer or more.

(e1) A proton conductor, wherein at least part of an acidic substance is immobilized on the inner wall of pores or through-holes of a porous body to form a first layer; and a hydrophilic part of a basic substance is oriented toward a hydrophilic part of the immobilized acidic substance to form a second layer.

(e2) A proton conductor, wherein at least part of a basic substance is immobilized on the inner wall of pores or through-holes of a porous body to form a first layer; and a hydrophilic part of an acidic substance is oriented toward a hydrophilic part of the immobilized basic substance to form a second layer.

(e3) A proton conductor, wherein at least part of an acidic substance is immobilized on the inner wall of pores or through-holes of a porous body to form a first layer; and a hydrophobic part of the basic substance is oriented toward a hydrophobic part of the immobilized acidic substance to form a second layer.

(e4) A proton conductor, wherein at least part of a basic substance is immobilized on the inner wall of pores or through-holes of a porous body to form a first layer; and a hydrophobic part of the acidic substance is oriented toward a hydrophobic part of the immobilized basic substance to form a second layer.

Incidentally, if a porous body having through-holes is used as a base material, it is possible to form a better ion-conducting path.

In the case where at least one of the acidic and basic substances is contained in the pores or through-holes of the porous body, a non-electron conductive substance is preferably filled in the remaining space in the pores or through-holes, when the proton conductor of the present invention is used as an electrolyte. It is possible to suppress the transmission of substances other than protons through the proton conductor by clogging the space with the non-electron conductive substance after forming the ion-conducting path. For example, when an electrolyte membrane for fuel cells is formed from the proton conductor, it is possible to reduce the leak of fuels and oxidizing agents through the electrolyte membrane.

Although organic substances may be used for the base materials, the base materials are preferably composed of inorganic substances, because inorganic substances are generally excellent in heat resistance, and it is easy to immobilize the acidic or basic substances by a covalent bond on the surface of the base materials composed of inorganic substances.

The present invention also relates to an electrolyte membrane comprising the above-described proton conductor. The electrolyte membrane of the present invention is the one provided by forming the above-described proton conductor into the form of a membrane by a variety of methods. The electrolyte membrane of the present invention can exhibit sufficient proton conductivity in a temperature range of from 100° C. to 200° C. even under low humidity.

The present invention also relates to an electrode comprising the above-described proton conductor. The electrode of the present invention is suitable as the anode and/or cathode for fuel cells. The anode and cathode for fuel cells contain a catalyst to promote oxidation of fuels and reduction of oxidizing agents in addition to the proton conductor.

The present invention also relates to a fuel cell comprising an anode, a cathode and an electrolyte membrane interposed therebetween. In the fuel cell of the present invention, at least one selected from the anode, the cathode and the electrolyte membrane contains the above-described proton conductor. The fuel cell of the present invention can operate in a temperature range of from 100° C. to 200° C. even under low humidity.

The fuel cell of the present invention includes all of the followings:

(f1) A fuel cell comprising an MEA in which a proton conductor of the present invention is contained only in the electrolyte membrane.

(f2) A fuel cell comprising an MEA in which a proton conductor of the present invention is contained only in the anode.

(f3) A fuel cell comprising an MEA in which a proton conductor of the present invention is contained only in the cathode.

(f4) A fuel cell comprising an MEA in which a proton conductor of the present invention is contained only in the electrolyte membrane and the anode.

(f5) A fuel cell comprising an MEA in which a proton conductor of the present invention is contained only in the electrolyte membrane and the cathode.

(f6) A fuel cell comprising an MEA in which a proton conductor of the present invention is contained only in the anode and the cathode.

(f7) A fuel cell comprising an MEA in which a proton conductor of the present invention is contained in the anode, the cathode and the electrolyte membrane.

The proton conductor of the present invention is chemically stable and exhibits high proton conductivity in a high temperature range (for example from 100° C. to 200° C.) even under low humidity. The proton conductor of the present invention can be applied to fuel cells and other various devices using ion conductors such as primary batteries, secondary batteries, capacitors, sensors, electrochromic devices, electrolytic cells, hydrogen pumps, actuators and solar cells, and it improves device properties. For example, when the electrolyte membrane or the electrode of a fuel cell is provided by using the proton conductor of the present invention, it is possible to miniaturize or omit the humidifier in the operating system of the fuel cell. Moreover, it is possible to increase the output of the fuel cell by increasing the operating temperature thereof from the current about 70 to 80° C. to 100° C. or higher.

BEST MODE FOR CARRYING OUT THE INVENTION

First Embodiment

Figure 1:
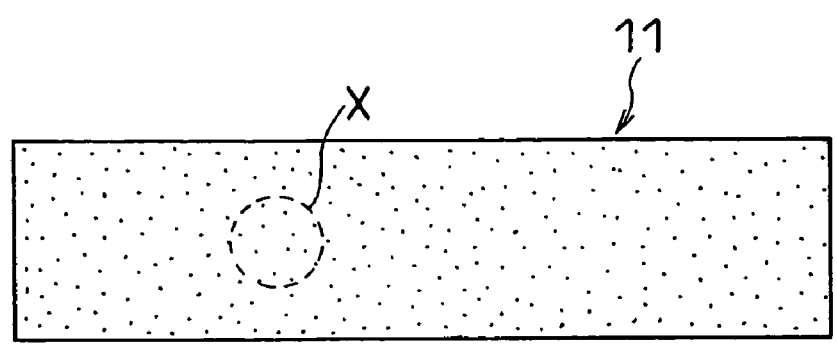
FIG. 1 is a schematic sectional view of a proton conductor according to a first embodiment of the present invention.
Figure 2:
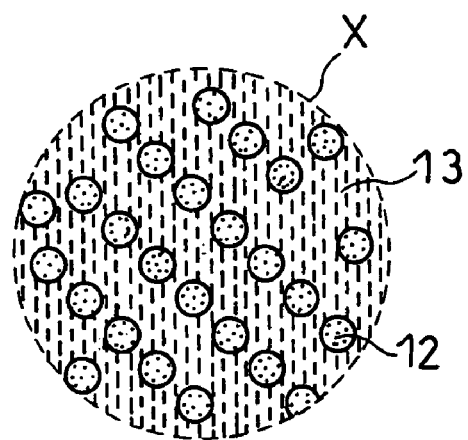
FIG. 2 is a schematic view of the interior of a proton conductor according to a first embodiment of the present invention.

FIG. 1 is a schematic sectional view of a membrane formed from a proton conductor according to the present embodiment, and FIG. 2 is a schematic view of the interior of a proton conductor according to the present embodiment. In FIGS. 1 and 2, there are dispersed, in a proton conductor 11, granular base materials 12 on whose surface an acidic substance or a basic substance is immobilized by a covalent bond. A polymer 13 as a matrix which retains the base material 12 is present around the base material 12. When an acidic substance is immobilized on the surface of the base material, the polymer 13 is composed of a basic substance; and when a basic substance is immobilized on the surface of the base material, the polymer 13 is composed of an acidic substance.

At the interface between the surface of the base material 12 and the polymer 13, protons of the acidic substance are dissociated by the basic substance to form acid-base bonding. Protons dissociated by base are present at the interface between the surface of the base material and the polymer where acid-base bonding is formed. Consequently, the interface forms an ion-conducting path and exhibits high ion conductivity.

The acid-base bonding refers to bonding that operates between an acidic substance and a basic substance, and means the bonding by Coulomb force between the acidic substance which has released protons to form acid anions and the basic substance which has received the protons to form base cations, that is, between anions and cations.

The interaction between acid and base acts as a holding power for restraining the acidic substance or the basic substance in the proton conductor. Moreover, since the acidic substance or the basic substance is firmly immobilized on the surface of the base material by a covalent bond, elution of the acidic substance or the basic substance from the proton conductor or dissolution of the acidic substance or the basic substance in water is suppressed. Consequently, a chemically stable proton conductor is obtained.

For improving ion conductivity, it is effective to increase the introduced amount of the acidic substance or the basic substance to be immobilized on the surface of the base material. In the present embodiment, it is possible to increase the introduced amount of the acidic substance or the basic substance without reducing chemical stability of the proton conductor by increasing the surface area of the base material.

The method for dispersing in a polymer a base material on whose surface an acidic substance or a basic substance is immobilized is not particularly limited, but, for example, the base material on whose surface an acidic substance or a basic substance is immobilized may be mixed with a specified polymer. Alternatively, a convenient method comprises dissolving a polymer in a solvent to prepare a solution, dispersing in the solution a base material on whose surface an acidic substance or a basic substance is immobilized, and forming the resulting dispersion into any shape. The proton conductor can be formed into a membrane by casting the dispersion followed by drying. FIG. 1 shows a membrane composed of a proton conductor, but the proton conductor of the present embodiment may be formed into any shape.

When a basic substance is immobilized on a surface of a base material, the polymer to disperse the base material contains at least an acidic substance (acidic polymer). The acidic polymer is not particularly limited, but various polymers can be used which have acidic functional groups in the main chain or in the side chain. Typical examples of the acidic polymers include perfluorosulfonated hydrocarbons, sulfonated polyether ether ketones, sulfonated polyether ether sulfones, sulfonated polystyrenes, polyvinyl phosphates and the like.

When an acidic substance is immobilized on a surface of a base material, the polymer to disperse the base material contains at least a basic substance (basic polymer). The basic polymer is not particularly limited, but various polymers can be used which have basic functional groups in the main chain or in the side chain. Typical examples of the basic polymers include polybenzimidazoles, polyvinylimidazoles, polybenzoxazoles, polybenzothiazoles and the like.

The polymers to disperse the base material may be a mixture of an acidic polymer and a basic polymer, and may further include a neutral polymer. Alternatively, a mixture of an acidic polymer and a neutral polymer or a mixture of a basic polymer and a neutral polymer may be used.

For obtaining a proton conductor to be applied to fuel cells, it is preferable to use a base material on whose surface at least an acidic substance is immobilized and to contain at least a basic polymer in a polymer in which the base material is dispersed, because the acidic polymer is prone to be unstable chemically and in strength when the introduced amount of an acidic functional group is increased. It is more advantageous to immobilize the acidic substance on the base material rather than using it as a polymer.

From the viewpoint of reinforcing a formed article of a proton conductor, the proton conductor may contain a reinforcing material. The form of the reinforcing material is not particularly limited, but includes, for example, fillers and resins to be added to a matrix of polymers, mesh-like core materials, porous bodies having pores or through-holes in which proton conductors can be filled, closely-packed or porous sheets capable of retaining a membrane of proton conductors on a surface thereof and the like.

When a proton conductor of the present invention is used as an electrolyte membrane, the reinforcing material is not particularly limited as long as it is a material having no electron conductivity, but various materials may be used. Examples of the reinforcing materials include oxides such as alumina, silica and titania, and polymers such as polyolefin resins, fluorocarbon resins, aramid resins, silicone resins, amide resins, imide resins, melamine resins, polyvinylidene fluoride, polysiloxane, polyacrylonitrile, polytetrafluoroethylene and polyphosphazene. When a proton conductor of the present invention is used by containing it in an electrode, the reinforcing material may be a material having electron conductivity. Specifically, carbon, metal, conductive polymers and the like can be used in addition to the above-described materials having no electron conductivity.

Next, specific examples of a surface of a base material on which an acidic substance is immobilized will be described.

Figure 3:
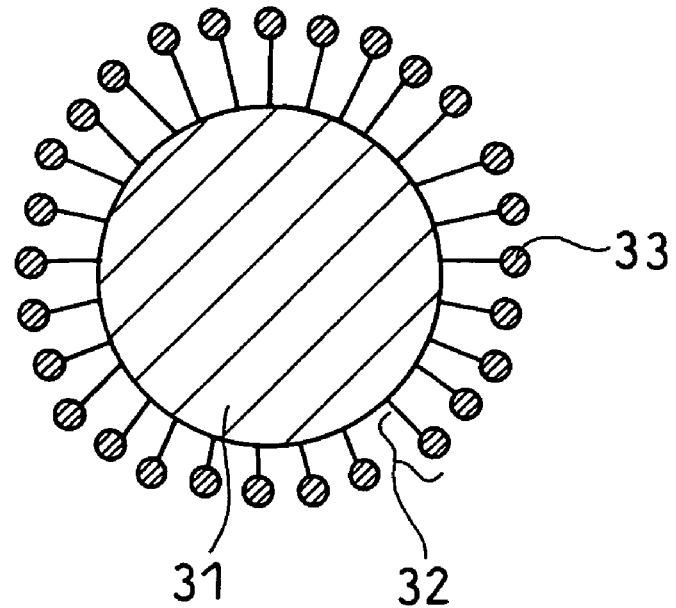
FIG. 3 is a conceptual view showing the state of bonding between a surface of a base material and an acidic substance according to a first embodiment of the present invention.
Figure 3A:
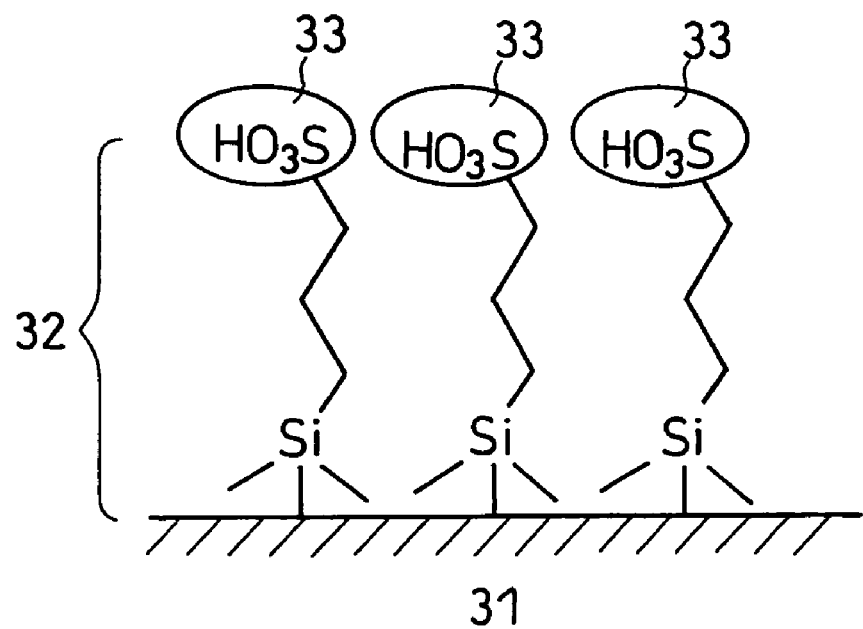
FIG. 3a is an enlarged conceptual view of the surface of the base material in FIG. 3.

FIG. 3 is a conceptual view showing the state of bonding between a surface of a base material and an acidic substance according to the present embodiment, and FIG. 3a is an enlarged conceptual view of the surface of the base material. In FIGS. 3 and 3a, one end of an organic molecule 32 which is an acidic substance is immobilized on the surface of a granular base material 31 by a covalent bond. A sulfonic acid group 33 which is an acidic group is present at the other end of the organic molecule 32.

A method for immobilizing the organic molecule 32 having the sulfonic acid group 33 on the surface of the base material 31 is not particularly limited, but it is possible to use a coupling reaction when an organic substance is immobilized on a surface of a base material having an active hydrogen. For example, when a silane coupling reaction is used, the organic molecule 32 is immobilized on a surface of a base material through the bonding between a hydroxy group on the surface of the base material and Si.

A coupling agent is dissolved, for example, in a solvent to obtain a solution and a base material is immersed therein, so that an active hydrogen on the surface of the base material is coupled to a bonding group of the coupling agent, immobilizing an organic molecule on the surface of the base material. When the bonding group is a silane group, a siloxane bonding is formed.

The coupling agents for use in the coupling reaction are not particularly limited, but include organic molecules containing a $SiX_nY_m$ group in the molecule (wherein X is, each independently, a halogen atom or an alkoxy group having a carbon number of 8 or less; Y is, each independently, a substituted aromatic ring containing at least one hydrocarbon group having a carbon number of 8 or less, a hydrogen atom, a hydrocarbon group having a carbon number of 8 or less or a phenyl group; and $0<n$, $0<m$ and $n+m=3$).

In addition, an organic molecule containing at least one selected from the group consisting of functional groups represented by the following formulae (1) to (3) may also be used as a coupling agent.

[Chemical formula 1]

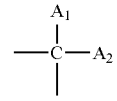

Formula (1)

[Chemical formula 2]

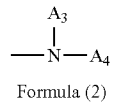

Formula (2)

[Chemical formula 3]

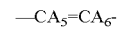

Formula (3)

In formulae (1) to (3), $A_1$ to $A_6$ are each at least one selected from —$(CH_2)_s$COOH (wherein s denotes an integer of from 0 to 3), —(CH$_2$)$_t$OH (wherein t denotes an integer of from 0 to 3), and —(CH$_2$)$_u$NXY (wherein u denotes an integer of from 0 to 2; and X and Y are, each independently, a substituted aromatic ring containing at least one hydrocarbon group having a carbon number of 8 or less, a hydrogen atom, a hydrocarbon group having a carbon number of 8 or less or a phenyl group).

FIG. 3a illustrates the organic molecule 32 having a bonding site containing Si, but Ti, Ge, Sn, Zr, Hf or the like may be used as the bonding site besides Si. In this case also, a coupling agent having a functional group represented by formulae (1) to (3) may be used.

When an acidic substance having a sulfonic acid group is immobilized on a surface of a base material, an organic molecule is immobilized on the surface of the base material by using, for example, a coupling agent having a group into which a sulfonic acid group can be introduced. Then, a sulfonic acid group is introduced into the group into which a sulfonic acid can be introduced, thereby introducing a sulfonic acid group into the organic molecule. Alternatively, a coupling agent having a sulfonic acid group in advance may be used to immobilize an organic molecule having a sulfonic acid group on a surface of a base material. Other various methods may be used to immobilize an acidic substance having a sulfonic acid group on a surface of a base material.

When the coupling agent as described above is used, it is required that an active hydrogen to which a coupling agent can couple be present on a surface of a base material. Therefore, metal oxides, glass, ceramics, clay, carbon, resins, silica and the like can be used as the base material. More specifically, transition metal oxides, alumina, fluorocarbon resins, aramid resins, silicone resins, amide resins, imide resins, melamine resins and the like can be used. When a base material composed of a porous body is required, porous ceramics such as silica gel, zeolite, titania and alumina may be used. When a proton conductor of the present invention is used as an electrolyte membrane, a base material having no electron conductivity is typically used, but even a material having electron conductivity such as metal may be used as a base material as long as the electron conductivity is greatly reduced by a surface treatment or the like. When a proton conductor of the present invention is used by containing it in an electrode, the base material may be a material having electron conductivity.

In order to immobilize an acidic substance or a basic substance on a surface of a base material, the base material preferably has a larger specific surface area, for example, preferably a specific surface area of 10 m$^2$/g or more, and more preferably a specific surface area of 100 m$^2$/g or more. Moreover, since a superior proton conductor can be obtained by dispersing a base material uniformly in the proton conductor, the base material is preferably composed of particulates. The particulates preferably have an average particle size of 30 µm or less, and more preferably 0.1 µm or less.

Acidic groups which can be used, besides a sulfonic group, include a phosphonyl group (—HPO), a phosphinyl group (—H$_2$PO), a sulfonyl group (—SO$_2$—), a sulfinyl group (—SO—), carboxyl group (—COOH), a phosphonic acid group (—PO(OH)$_2$), a phosphinic acid group (—HPO(OH)), a sulfonic acid group (—SO$_3$H), a sulfinic acid group (—SO$_2$H), a mercapto group (—SH), a hydroxy group (—OH), a phosphoric acid group (—PO$_4$) and the like. Among them, an organic molecule having a carboxyl group, a phosphonic acid group or a sulfonic acid group, which has high acidity, is preferred. Although such an organic molecule has high acidity, it has a high degree of dissociation and tends to provide a proton conductor excellent in proton conductivity.

Basic substances to be immobilized on a base material include organic molecules containing an ether bonding group (—O—), a nitro group (—NO$_2$), a quaternary ammonium group (—NH$_4^+$), an amino group (—NH$_2$), and a heterocyclic nitrogen-containing group such as an imidazole group, a benzimidazole group, an oxazole group or an indole group. Among them, an organic molecule having a quaternary ammonium group, an amino group or a heterocyclic nitrogen-containing group is preferred in terms of having excellent basicity and stability.

Combination of the acidic and basic substances is not particularly limited. It is possible to use various combinations which can form the acid-base pair as defined by Broensted.

Second Embodiment

The proton conductor of the present embodiment is the same one as that described in the first embodiment except that the state of an organic molecule to be immobilized on a surface of a base material is different. Therefore, the following description will be concentrated on the points of difference between the first and the second embodiment. Here, specific examples of a surface of a base material on which an acidic substance is immobilized will be described.

Figure 4:
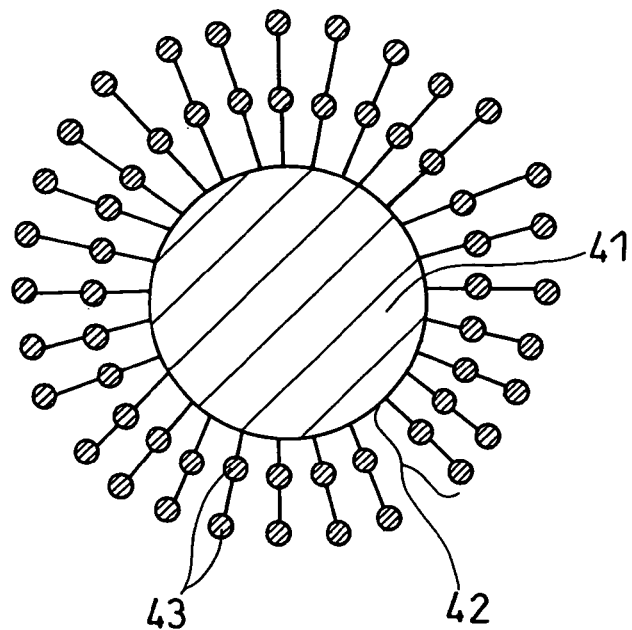
FIG. 4 is a conceptual view showing the state of bonding between a surface of a base material and an acidic substance according to a second embodiment of the present invention.
Figure 4A:
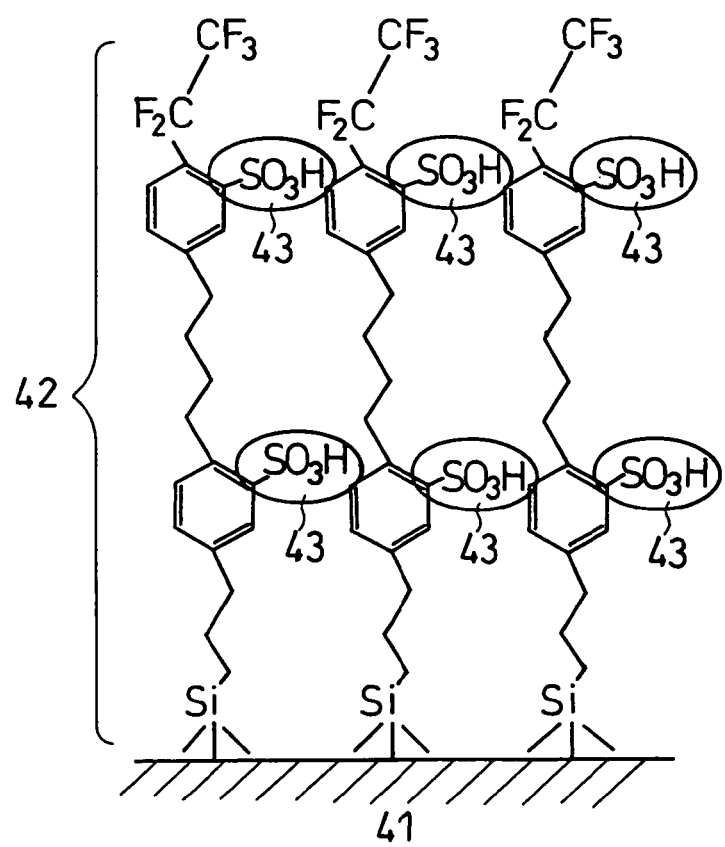
FIG. 4a is an enlarged conceptual view of the surface of the base material in FIG. 4.

FIG. 4 is a conceptual view showing the state of bonding between a surface of a base material and an acidic substance according to the present embodiment, and FIG. 4a is an enlarged conceptual view of the surface of the base material. In FIGS. 4 and 4a, one end of a built-up organic molecule 42 which is an acidic substance is immobilized on the surface of a granular base material 41 by a covalent bond. Various coupling reactions as described in the first embodiment can be utilized for the bonding between the base material and the organic molecule. FIG. 4a illustrates an example in which the built-up organic molecule 42 having two sulfonic acid groups 43 is immobilized on the surface of the base material by using a silane coupling agent.

The built-up organic molecule 42 is obtained, for example, by immobilizing a first organic molecule (coupling agent) on the base material and then introducing a second organic molecule into the first organic molecule. Arbitrary numbers of organic molecules can be built up and immobilized on a surface of the base material by further repeating similar operations. At this time, when each organic molecule has a sulfonic acid group in advance, it is possible to immobilize a built-up organic molecule having a plurality of sulfonic acid groups on a surface of the base material by only building up the organic molecules. When each organic molecule has no sulfonic acid group in advance, the sulfonic acid group is introduced into each organic molecule unit after the organic molecules are built up. Alternatively, a built-up organic molecule composed of a plurality of organic molecule units is prepared in advance, and this may be immobilized on a surface of the base material. It is possible to immobilize a built-up organic molecule having a plurality of sulfonic acid groups on a surface of the base materials by other various methods.

A coupling agent which has a bonding group to a base material and a bonding group to an organic molecule unit is used. For example, a group having a double bond may be utilized as the bonding group to an organic molecule unit. The coupling agent may or may not have a sulfonic acid group. When the coupling agent does not have a sulfonic acid group, the sulfonic acid group may or may not be introduced after building up an organic molecule.

When a plurality of organic molecules are built up, each organic molecule unit is required to have a bonding site to other organic molecule units. Thus, each organic molecule unit has a pair of bonding sites so as to enable build-up. Each organic molecule unit has an acidic group or a basic group, or has a group into which an acidic group or a basic group can be introduced. The number of build-up of organic molecule units is not particularly limited. Even if the surface area of a base material is the same, the amount of an acidic group or a basic group to be introduced into the base material can be increased by immobilizing a built-up organic molecule on the base material as an acid substance or a basic substance.

Third Embodiment

The proton conductor of the present embodiment is the same one as that described in the first embodiment except that the state of an organic molecule to be immobilized on a surface of a base material is different. Therefore, the following description will be concentrated on the points of difference between the first embodiment and the third embodiment. Here, specific examples of a surface of a base material on which an acidic substance is immobilized will be described.

Figure 5:
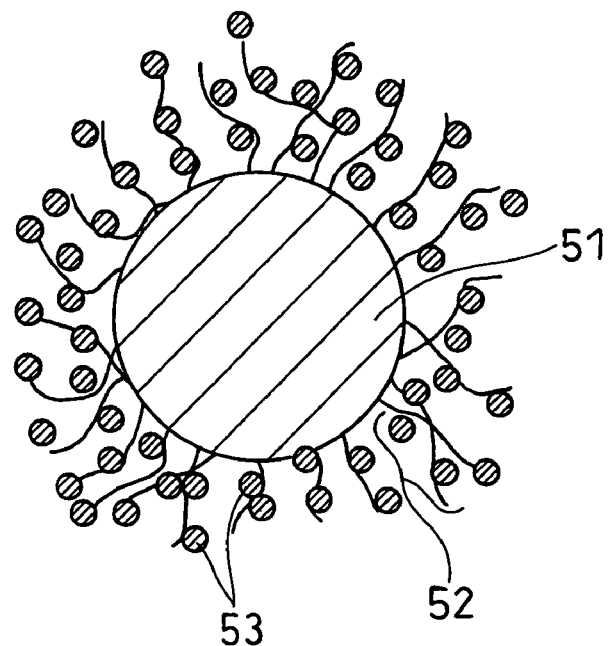
FIG. 5 is a conceptual view showing the state of bonding between a surface of a base material and an acidic substance according to a third embodiment of the present invention.
Figure 5A:
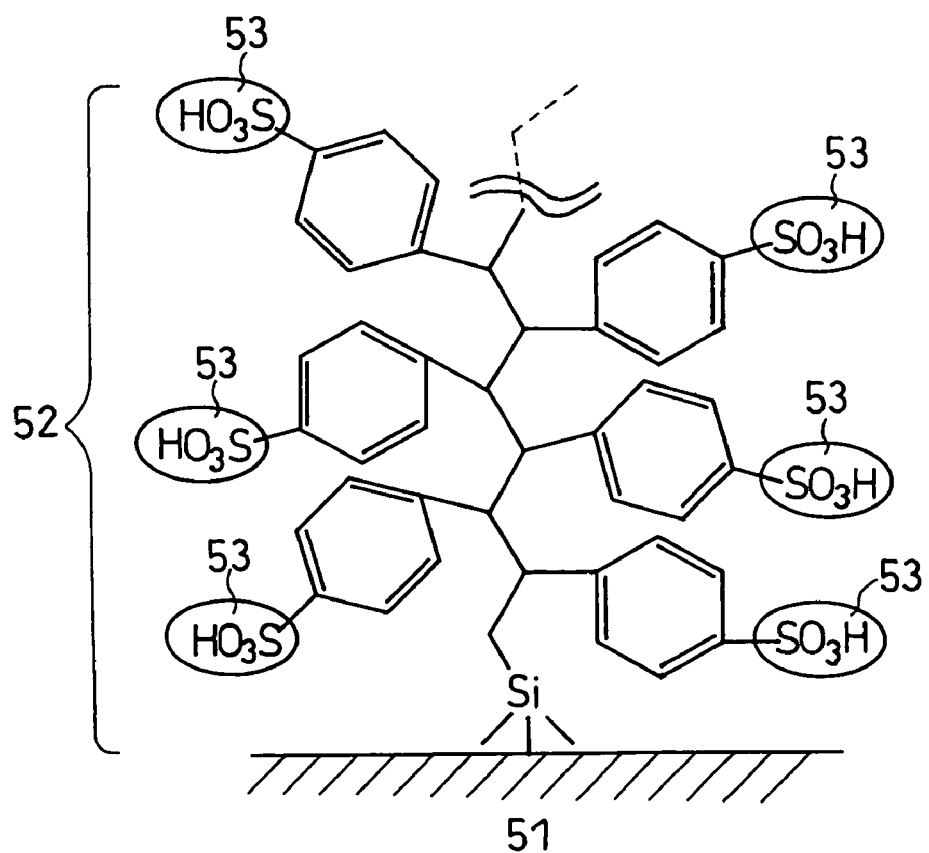
FIG. 5a is an enlarged conceptual view of the surface of the base material in FIG. 5.

FIG. 5 is a conceptual view showing the state of bonding between a surface of a base material and an acidic substance according to the present embodiment, and FIG. 5a is an enlarged conceptual view of the surface of the base material. In FIGS. 5 and 5a, one end of an organic polymer 52 which is an acidic substance is immobilized by a covalent bond on the surface of a granular base material 51. Various coupling reactions as described in the first embodiment can be utilized for the bonding between the base material and the organic polymer 52. FIG. 5a illustrates an example in which the organic polymer 52 having a plurality of sulfonic acid groups 53 is immobilized on the surface of the base material by using a silane coupling agent.

The organic polymer 52 can be immobilized on the surface of the base material, for example, by immobilizing a coupling agent having a polymerizable functional group such as a double bond on the base material and then bringing it in contact with a monomer which starts polymerization using the polymerizable functional group as the starting point to polymerize the monomer. At this time, when the monomer has a sulfonic acid group in advance, it is possible to immobilize the organic polymer having a plurality of sulfonic acid groups on the surface of the base material by only polymerizing the monomer. When the monomer does not have a sulfonic acid group in advance, the sulfonic acid group is introduced to each monomer unit after the monomer is polymerized. Alternatively, an organic polymer composed of a plurality of monomer units is prepared in advance, and this may be immobilized on the surface of the base material. It is possible to immobilize the organic polymer having a plurality of sulfonic acid groups on the surface of the base materials by other various methods.

A coupling agent which has a bonding group to a base material and a polymerizable functional group is used as the coupling agent. The coupling agent may or may not have a sulfonic acid group. When the coupling agent does not have a sulfonic acid group, the sulfonic acid group may or may not be introduced after polymerizing the monomer.

Various polymerization reactions can be utilized as a method for polymerizing monomers. Specifically, polymerization methods such as radical polymerization, anion polymerization, cation polymerization, living polymerization, catalytic polymerization, condensation polymerization, ring-opening polymerization, plasma graft polymerization and thermal polymerization may be used. The polymerization method may be selected by those skilled in the art depending on the type of monomer.

It is possible to immobilize an organic polymer on a surface of a base material without using a coupling agent. That is, various polymerization reactions as described above may also be utilized to directly grow the organic polymer from the surface of the base material. In this case, an organic substance can suitably be used as the base material. Specifically, organic particulates composed of polystyrene, polymethylmethacrylate, polyacrylates or the like may be used as the base material.

When organic particulates are used as a base material and an organic polymer which is an acidic substance or a basic substance is grown from a surface thereof, it is possible to introduce acidic groups or basic groups into the polymer in such a large amount that it is impossible to introduce them into a conventional uniform composite of an acidic polymer and a basic polymer. In the case of a uniform composite of an acidic polymer and a basic polymer, the acidic polymer, for example, may be dissolved in water, thereby making it impossible to introduce a large amount of acidic groups into the composite. On the other hand, when organic particulates are used as a base material, the organic polymer has a reduced solubility in water since it is integrated with the base material.

Desirably, the organic polymer, which is acidic or basic, to be immobilized on a surface of a base material easily forms acid-base bonding with an acidic polymer or a basic polymer which finally becomes a matrix. Therefore, the organic polymer to be immobilized on a surface of a base material is desirably a two-dimensionally extending linear polymer rather than a three-dimensionally crosslinked one.

Fourth Embodiment

Figure 6:
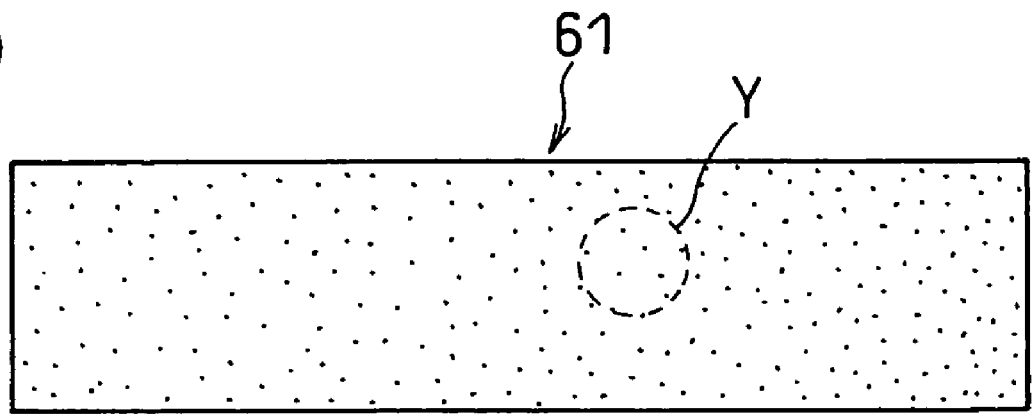
FIG. 6 is a schematic sectional view (a) of a proton conductor and a schematic view (b) of the interior of a proton conductor according to a fourth embodiment of the present invention.
Figure 6:
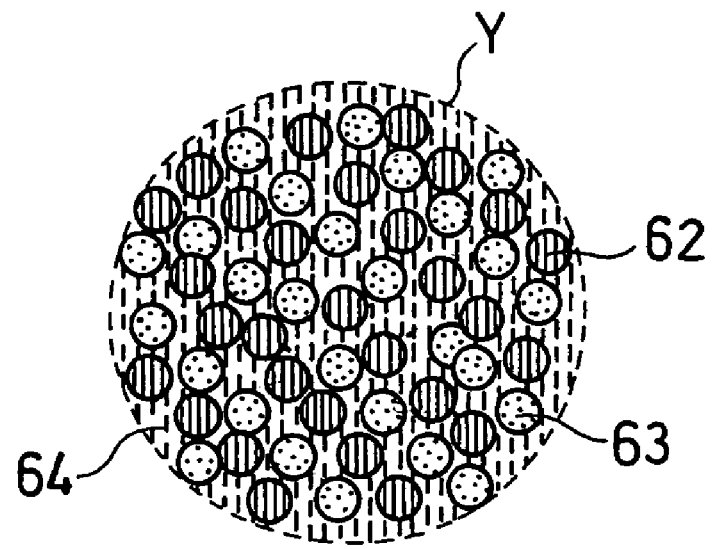

Also for the proton conductor of the present embodiment, the points of difference between the present embodiment and the first embodiment will be described. FIG. 6 shows a schematic sectional view (a) of a membrane formed from a proton conductor according to the present embodiment and a schematic view (b) of the interior of the proton conductor.

In FIG. 6, granular base materials 62 on whose surface an acidic substance is immobilized by a covalent bond and granular base materials 63 on whose surface a basic substance is immobilized by a covalent bond are dispersed in a proton conductor 61. Around the base materials 62 and the base materials 63 is present a polymer 64 as a matrix holding these base materials.

The proton conductor of the present embodiment can be obtained by combining base materials on whose surface an acidic substance is immobilized with base materials on whose surface a basic substance is immobilized, as shown in FIG. 6. Incidentally, the method for immobilizing an acidic substance or a basic substance on a surface of a base material is as already described in connection with the first to third embodiments.

At the interface of the acidic substance immobilized on the surface of the base material 62 and the basic substance immobilized on the surface of the base material 63, that is, at the space between the granular base material 62 and base material 63, protons of the acidic substance are dissociated by the basic substance, forming the acid-base bonding. Consequently, the protons dissociated by the base are present in the space between the base material 62 and the base material 63, so that the space forms an ion conducting path. Therefore, the polymer forming a matrix in FIG. 6 is not indispensable for forming a proton conductor, and the proton conductor can also be obtained without using the polymer 64.

When a polymer matrix is not used, it is possible to obtain a proton conductor by mixing a granular base material on which an acidic substance is immobilized and a granular base material on which a basic substance is immobilized. Further, a convenient method includes a method of dispersing in a solvent a mixture of a granular base material on which an acidic substance is immobilized and a granular base material on which a basic substance is immobilized and forming the resulting dispersion into an optional shape. For example, the proton conductor can be formed into a film by casting the dispersion followed by drying and optional pressing. FIG. 6 shows a membrane composed of a proton conductor, but the proton conductor of the present embodiment can be formed into an optional shape.

The acidic substance immobilized on the surface of the base material 62 is restrained by the acid-base bonding to the basic substance immobilized on the surface of the base material 63 and firmly immobilized on the surface of the base material 62 by a covalent bond. Similarly, the basic substance immobilized on the surface of the base material 63 is restrained by the acid-base bonding to the acidic substance immobilized on the surface of the base material 62 and firmly immobilized on the surface of the base material 63 by a covalent bond. As a result, elution of the acidic substance or the basic substance from the proton conductor or dissolution of the acidic substance or the basic substance into water is suppressed, thereby providing a chemically stable proton conductor.

When a polymer matrix is not used, the acidic and basic substances are each desirably immobilized on the surface of the base material as an organic polymer as described in the third embodiment.

When a polymer matrix is used, any of an acidic polymer, a basic polymer and a neutral polymer or a mixture thereof may be used as the polymer matrix 64. The polymer forming the matrix preferably has flexibility. The acidic polymer, the basic polymer and the neutral polymer are not particularly limited, but, for example, those described in the first embodiment can be used. The base material on whose surface an acidic substance is immobilized is stabilized and forms acid-base bonding by being brought into contact with a basic polymer in the matrix. Moreover, the base material on whose surface a basic substance immobilized is stabilized and forms acid-base bonding by being brought into contact with an acidic polymer in the matrix. Consequently, it is possible to obtain a proton conductor which is more stable and has high ion conductivity.

Fifth Embodiment

Figure 7:
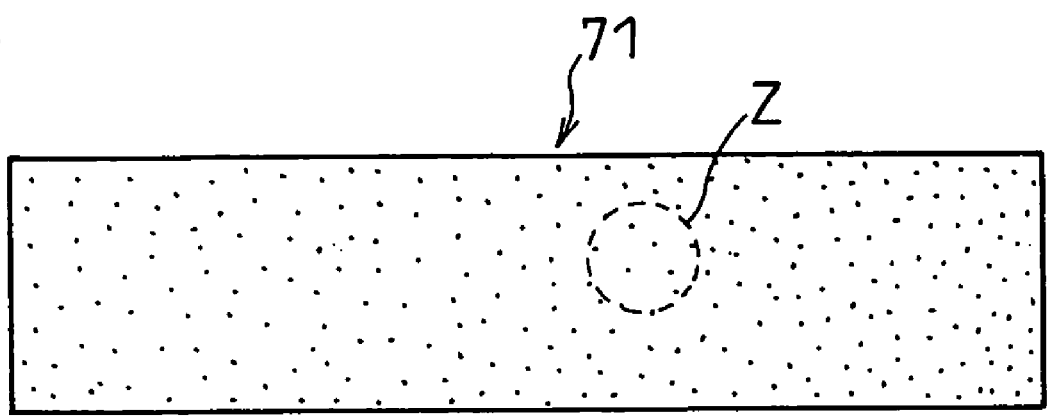
FIG. 7 is a schematic sectional view (a) of a proton conductor and a schematic view (b) of the interior of a proton conductor according to a fifth embodiment of the present invention.
Figure 7:
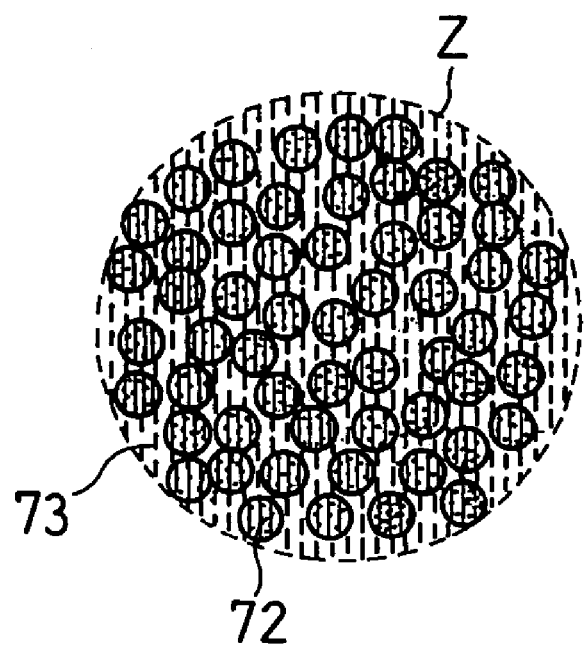

Also for the proton conductor of the present embodiment, the points of difference between the present embodiment and the first embodiment will be described. FIG. 7 shows a schematic sectional view (a) of a membrane formed from a proton conductor according to the present embodiment and a schematic view (b) of the interior of the proton conductor.

In FIG. 7, granular base materials 72 are dispersed in a proton conductor 71. Around the base materials 72 is present a polymer 73 as a matrix holding the base material 72.

Although it is not shown in FIG. 7, an acidic substance or a basic substance is immobilized by a covalent bond on the surface of the base material 72 as a first layer, on which a basic substance or an acidic substance is immobilized by acid-base bonding as a second layer. The acid-base bonding portion, that is, the vicinity of the surface of base material particles is used as the ion conducting path.

Therefore, the polymer 73 forming a matrix in FIG. 7 is not indispensable for forming a proton conductor, and the proton conductor can also be obtained without using the polymer 73. Incidentally, the method for immobilizing an acidic substance or a basic substance on a surface of a base material is as already described in connection with the first to third embodiments.

When a polymer matrix is not used, a base material in which an acidic substance is immobilized by a covalent bond as a first layer and a basic substance is immobilized thereon by acid-base bonding as a second layer, or a base material in which a basic substance is immobilized by a covalent bond as a first layer and an acidic substance is immobilized thereon by acid-base bonding as a second layer, can be used as it is as a proton conductor. Further, a convenient method includes a method of dispersing these base materials in a solvent and forming the resulting dispersion into an optional shape. For example, the proton conductor can be formed into a film by casting the dispersion followed by drying and optional pressing. FIG. 7 shows a membrane composed of a proton conductor, but the proton conductor of the present embodiment can be formed into an optional shape.

When a polymer matrix is not used, the acidic substance or the basic substance to be immobilized by a covalent bond on a surface of a base material may be immobilized as an organic polymer as described in the third embodiment.

When a polymer matrix is used, the polymer matrix 73 is not particularly limited, but it is possible to use, for example, an acidic polymer, a basic polymer, a neutral polymer or the like as described in the fourth embodiment.

Figure 8:
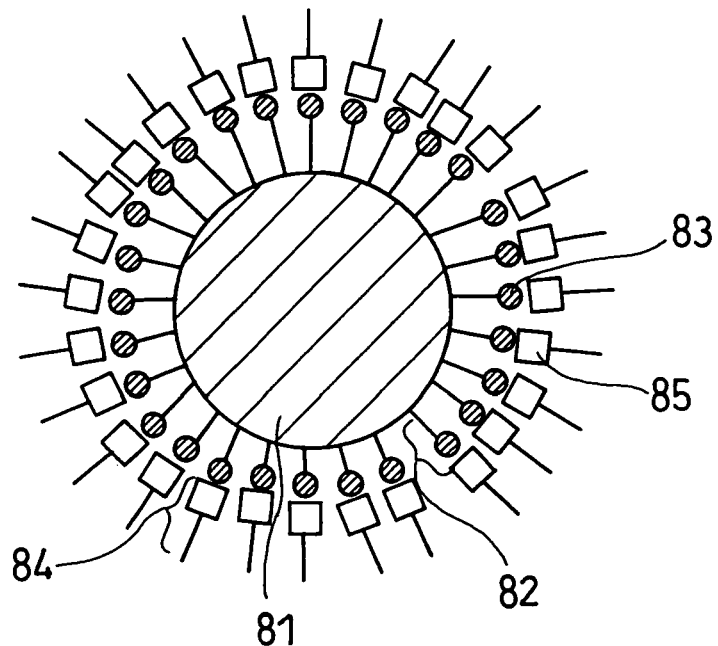
FIG. 8 is a conceptual view showing the state of bonding between the surface of a base material and an acidic substance, and the state of acid-base bonding between an acidic substance and a basic substance according to a fifth embodiment of the present invention.
Figure 8A:
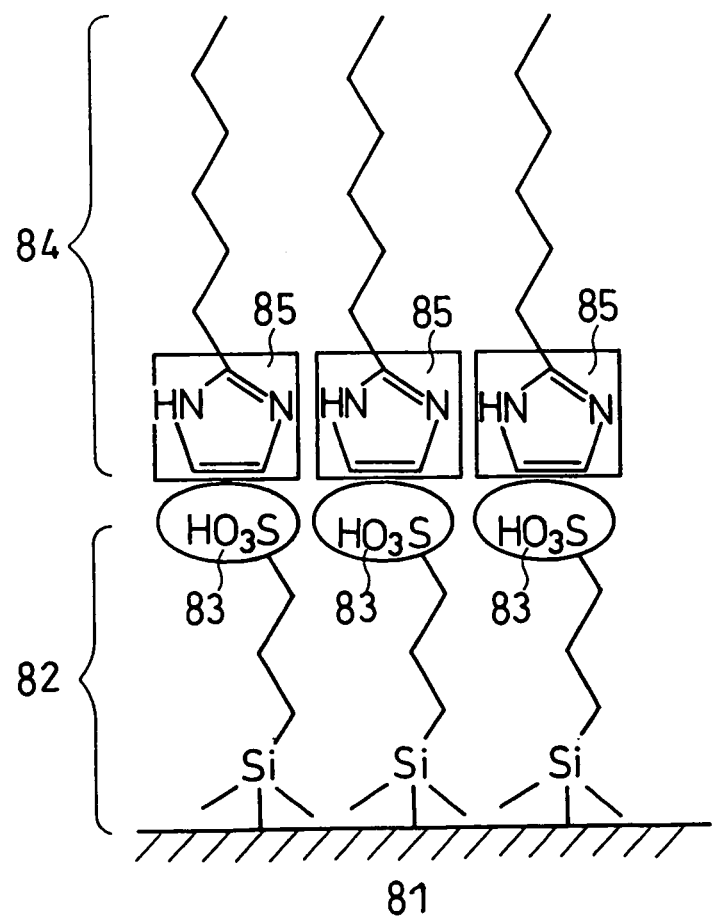
FIG. 8a is an enlarged conceptual view of the surface of the base material in FIG. 8.

FIG. 8 is a conceptual view showing the state of acid-base bonding between an acidic substance and a basic substance in the case where the acidic substance is immobilized by a covalent bond on a surface of a base material, and FIG. 8a is an enlarged conceptual view of the surface of the base material. In FIGS. 8 and 8a, one end of an organic molecule 82 which is an acidic substance is immobilized by a covalent bond on the surface of a granular base material 81. At the other end of the organic molecule 82, is present a sulfonic acid group 83 which is an acidic group.

The organic molecule 82 is immobilized on the surface of the base material 81 by utilizing a silane coupling reaction, forming a first layer. Next, on the organic molecule 82, an organic molecule 84 is immobilized by acid-base bonding, forming a second layer. The organic molecule 84 is a basic substance having an imidazole group 85. Thus, the imidazole group 85 in the organic molecule 84 and the sulfonic acid group 83 in the organic molecule 82 are opposed to each other, forming acid-base bonding.

For example, it is possible to immobilize a second layer of a basic substance by acid-base bonding on a first layer of an acidic substance by dissolving a basic organic molecule in a solvent to obtain a solution and immersing a base material on which the acidic substance is immobilized in the resulting solution. The solvent to be used at this time is not particularly limited as long as it can dissolve a basic organic molecule, but a nonpolar organic solvent can suitably be used. Alternatively, the basic organic molecule may be heated without using a solvent to form a melt, and the base material on which an acidic substance is immobilized may be immersed in the melt. Alternatively, the basic organic molecule may be vaporized under heating or in a vacuum environment to be adsorbed on the first layer.

The imidazole group 85 present at one end of the organic molecule 84 is a hydrophilic part. Therefore, if the other end of the organic molecule 84 is a hydrophobic part, it is possible to form a built-up film (LB film). In this case, on the organic molecule 84, an organic molecule having an acidic group (a hydrophilic part) at one end and a hydrophobic part at the other end is immobilized by acid-base bonding to form a third layer. Further, the number of build-up of the built-up films can be increased by using the organic molecule 84.

The first layer having a sulfonic acid group may be formed by immobilizing on a surface of a base material an organic molecule (coupling agent) into which a sulfonic acid group can be introduced and then introducing a sulfonic acid group into the organic molecule, or may be formed by immobilizing on a surface of a base material an organic molecule (coupling agent) having a sulfonic acid group in advance.

Also in the present embodiment, a basic molecule having a similar basic group as illustrated in the first embodiment can be used as the basic substance. However, when a built-up film is to be formed, the basic molecule preferably has a basic group as a hydrophilic part at one end and an alkyl chain as a hydrophobic part at the other end. That is, an organic molecule having both a hydrophilic part and a hydrophobic part in the molecule like a surfactant is preferred. Alternatively, a molecule having a basic group at one end and a polymerizable functional group such as a double bond at the other end may be used to grow a polymer starting from the polymerizable functional group.

When the proton conductor of the present invention is applied as an electrolyte membrane of a fuel cell, water solubility of the basic molecule to be immobilized by acid-base bonding is desirably as low as possible. Introduction of a hydrophobic part such as an alkyl group into the molecule is preferred also from the viewpoint of reducing water solubility of the basic molecule. Specifically, for example, melamine, benzimidazole, uracil or a derivative thereof may suitably be used as a basic substance.

Sixth Embodiment

Also for the proton conductor of the present embodiment, the points of difference between the present embodiment and the first embodiment will be described. In the present embodiment, a porous body having pores or through-holes is used as a base material. At least one of an acidic and basic substances is contained in the through-holes, and the at least one of the acidic and basic substances is immobilized by a covalent bond on the inner wall surface of the through-holes.

Figure 9:
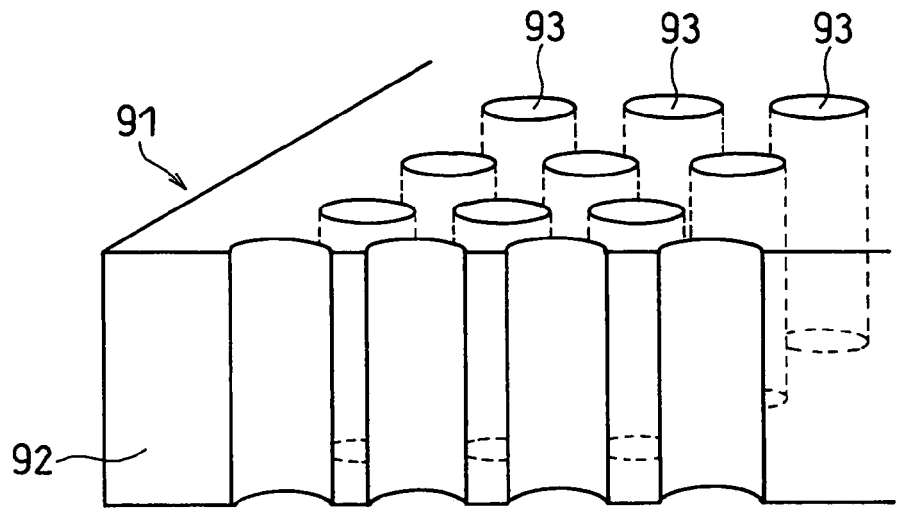
FIG. 9 is a schematic perspective view of a proton conductor according to a sixth embodiment of the present invention.

FIG. 9 is a schematic perspective view of an example of a proton conductor according to the present embodiment. A proton conductor 91 contains a sheet-like porous body having through-holes 93 as a base material 92. Although it is not shown, an acidic substance and a basic substance are contained in the thorough-holes 93. On the inner wall surface of the through-holes, the acidic substance and/or the basic substance is immobilized by a covalent bond to form a first layer. Alternatively, in the through-holes 93, the acidic substance and/or the basic substance is filled, or the acidic substance and/or the basic substance is immobilized on the first layer by acid-base bonding as a second layer.

Incidentally, the method for immobilizing an acidic substance or a basic substance on the inner wall surface of the through-holes is as already described in connection with the first to third embodiments.

Figure 9A:
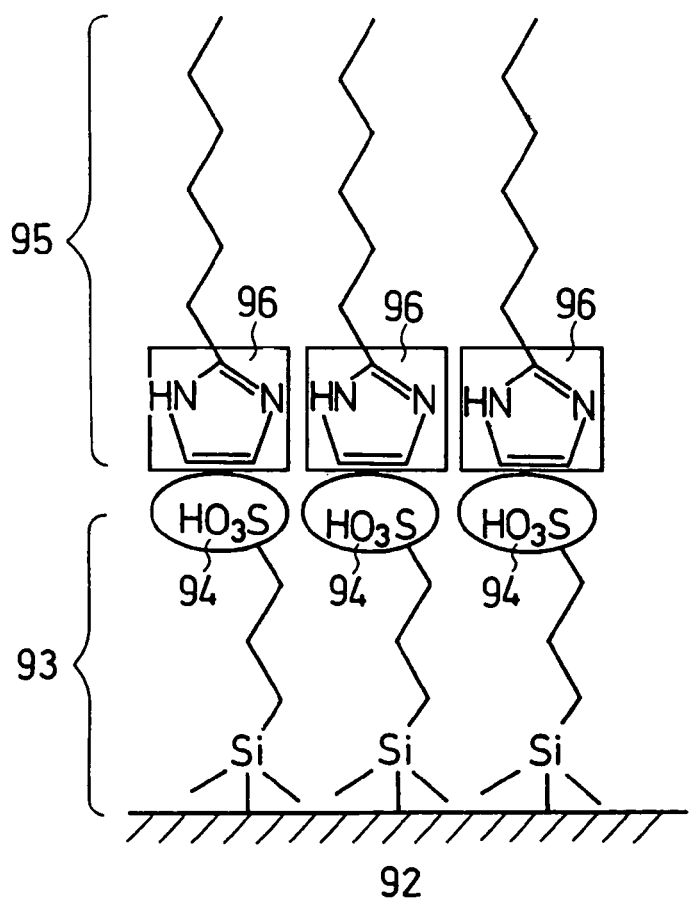
FIG. 9a is an enlarged conceptual view of the inner wall surface of through-holes which the base material in FIG. 9 has.

FIG. 9a schematically shows the case where an organic molecule 93 having a sulfonic acid group 94 is immobilized on the inner wall surface of the through-holes by a coupling reaction. On the inner wall surface of the through-holes, the organic molecule 93 is immobilized by a covalent bond to form a first layer, on which an organic molecule 95 having an imidazole group 96 is immobilized by acid-base bonding as a second layer. As a result, the acid-base bonding portion formed in the vicinity of the inner wall surface of the through-holes is used as the ion conducting path.

Also in the present embodiment, as in the fifth embodiment, it is possible to immobilize a second layer of a basic substance by acid-base bonding on a first layer of an acidic substance by dissolving a basic organic molecule in a solvent to obtain a solution and immersing a base material on which the acidic substance is immobilized in the resulting solution. Alternatively, the basic organic molecule may be heated without using a solvent to form a melt, and the base material on which an acidic substance is immobilized may be immersed in the melt. Alternatively, the basic organic molecule may be vaporized under heating or in a vacuum environment to be adsorbed on the first layer.

Also in the present embodiment, as in the fifth embodiment, it is possible to form a built-up film (LB film). Moreover, the first layer having a sulfonic acid group may be formed by immobilizing on a surface of a base material an organic molecule (coupling agent) into which a sulfonic acid group can be introduced and then introducing a sulfonic acid group into the organic molecule, or may be formed by immobilizing on a surface of a base material an organic molecule (coupling agent) having a sulfonic acid group in advance.

Also in the present embodiment, as in the fifth embodiment, a basic molecule having a similar basic group as illustrated in the first embodiment can be used as the basic substance. Moreover, when a built-up film is to be formed, the basic molecule is preferably an organic molecule having both a hydrophilic part and a hydrophobic part like a surfactant. Alternatively, a molecule having a basic group at one end and a polymerizable functional group such as a double bond at the other end may be used to grow a polymer starting from the polymerizable functional group. Moreover, when an acidic substance or a basic substance is filled in the pores or through-holes of a porous body, the acidic substance or the basic substance immobilized on a different base material may be used.

In the case where a space is present in the through-holes after the acidic and basic substances are contained, a non-electron conductive substance may be filled in the space so that it clogs the space, when a proton conductor of the present invention is used as an electrolyte membrane. It is possible to suppress transmission of substances other than ions through the proton conductor by clogging the space. The non-electron conductive substances used for clogging the space include, for example, hydrocarbon or fluorocarbon resins such as poly(vinylidene fluoride), polysiloxane, polyacrylonitrile, polytetrafluoroethylene, polyphosphazene and polystyrene. When the proton conductor of the present invention is used by containing it in an electrode, an electron conductive substance may be filled in the space so that it clogs the space.

Not only a sheet-like porous body having through-holes as shown in FIG. 9, but also porous bodies of various forms can be used as a base material. The form of base materials may be selected depending on the applications in which proton conductors are used. For example, in an electrolyte membrane of a fuel cell, a moving path of electrons is desirably formed without interruption in the thickness direction of the membrane. Therefore, for forming an electrolyte membrane, a sheet-like porous body having through-holes is suitable. However, it is also possible to form an electrolyte membrane by filling an acidic substance and a basic substance, for example, in the pores of a granular porous body followed by forming. In this case, the space between particles plays the same role of the through-holes.

Seventh Embodiment

A fuel cell using a proton conductor of the present invention will be described.

Figure 10:
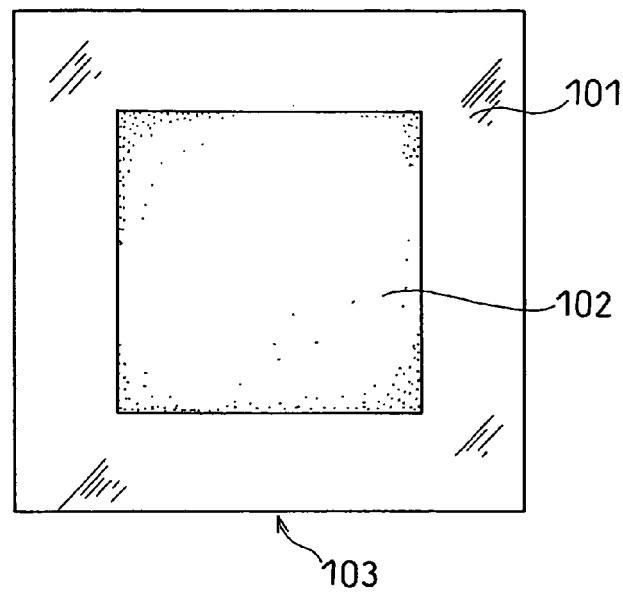
FIG. 10 is a schematic plan view of a membrane electrode assembly according to a seventh embodiment of the present invention.

A fuel cell generally includes a membrane electrode assembly (MEA) consisting of an electrolyte membrane and a pair of electrodes sandwiching the same. FIG. 10 is a schematic plan view of an MEA. An MEA 103 comprises an electrolyte membrane 101, a cathode 102 disposed on one surface thereof and an anode disposed on the other surface thereof (not shown). The electrolyte membrane 101 is disposed between the cathode 102 and the anode. The electrolyte membrane and each electrode are integrated by pressing or the like.

Figure 11:
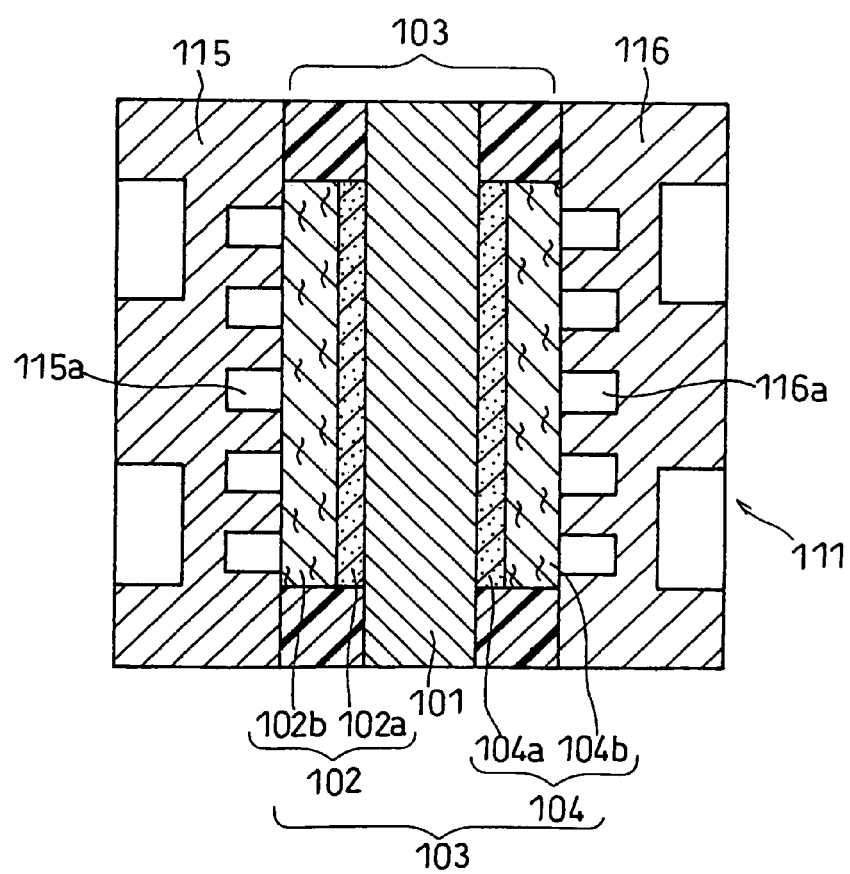
FIG. 11 is a schematic sectional view of a fuel cell according to a seventh embodiment of the present invention.

FIG. 11 is a schematic sectional view of a typical fuel cell.

A fuel cell 111 is provided with the MEA 103 comprising the electrolyte membrane 101, the cathode 102 and the anode 104. The cathode 102 comprises a catalyst layer 102a in contact with the electrolyte membrane 101 and a diffusion layer 102b disposed at the outside of the catalyst layer 102a. The anode 104 comprises a catalyst layer 104a in contact with the electrolyte membrane 101 and a diffusion layer 104b disposed at the outside of the catalyst layer 104a. The MEA 103 is sandwiched by a cathode-side separator 115 having an oxidizing-agent channel 115a to supply an oxidizing agent to the cathode 102 and an anode-side separator 116 having a fuel channel 116a to supply a fuel to the anode 104. Further, at the outside of the cathode-side separator 115 and the anode-side separator 116, cooling water channels 115b and 116b to circulate cooling water are formed, respectively. However, when a fuel cell is cooled by air, the cooling water channel is not necessarily required.

A film formed from a proton conductor of the present invention may be used as the electrolyte membrane 101 of the MEA. A composite of a proton conductor of the present invention, catalyst particles and an electron conductive substance such as a carbon powder may be used as the cathode 102 or the anode of the MEA. The thus obtained MEA develops high output in a temperature range of from 100° C. to 200° C. even under low humidity. Therefore, the fuel cell containing the MEA also develops high output under the similar environment. Noble metals such as Pt and Ru are preferably used as the catalyst.

When the electrolyte membrane is formed from a proton conductor, the form of a base material is not particularly limited, but powder, particles, particulates, films, sheets or the like may be used. When the proton conductor is contained in the catalyst layer of the anode or cathode, powder, particles, particulates or the like are preferably used.

Incidentally, FIGS. 10 and 11 show only an example of a fuel cell, and the proton conductor of the present invention is not limited to the application to the fuel cell as shown in these figures. Further, the structure other than the MEA is not particularly limited, but it may be similar to that in typical polymer electrolyte fuel cells. Furthermore, the proton conductor of the present invention may also be applied to portable fuel cells in which a liquid fuel is supplied from a cartridge or the like.

Various fuels can be used in the fuel cells using the proton conductor of the present invention. For example, hydrogen and gaseous or liquid hydrocarbons can be used in a manner similar to conventional fuel cells. Hydrocarbons which can be used include, for example, alcohols such as methanol, ethanol and ethyleneglycol, and ethers such as dimethyl ether, dimethoxymethane, trimethoxymethane and trioxane. Liquid fuels preferably used as an aqueous solution may be used.

Next, the present invention will be more specifically described with reference to examples, but the present invention is not limited to the following examples.

EXAMPLE 1

A proton conductor was obtained by using inorganic particulates as a base material, immobilizing an organic molecule having a sulfonic acid group by a covalent bond on a surface of the base material, and dispersing the base material in a basic polymer. The procedure will be shown below.

Titania particulates (an average particle size of 30 nm, a specific surface area of 50 m²/g) were used as the inorganic particulates. First, 0.2 g of an alkoxysilane compound containing an epoxy group at a terminal of the organic molecule was dissolved in 10 ml of a toluene solvent to obtain a solution, and then 1 g of the titania particulates was immersed in the solution to allow them to react at 70° C. for 2 hours. As the alkoxysilane compound, $CH_2(\text{—O—})CHCH_2O(CH_2)_3Si(OCH_3)_3$ was used, wherein (—O—) represents an oxygen in the epoxy group.

In this process, dealcoholization reaction occurred between the hydroxy groups (—OH) at the surface of the base material and alkoxy groups of the above-described alkoxysilane compound, immobilizing the organic molecule by a covalent bond on the surface of the base material. It is likely that the dealcoholization reaction proceeded as represented by the following formula (4). Incidentally, formula (4) represents the reaction between three hydroxy groups to be bonded to "the base material" and an alkoxysilane compound, but one alkoxysilane compound molecule may be covalently bonded to one base-material particle or to a plurality of base-material particles. Byproduct alcohol was omitted from the formula. The omission was made also in the chemical formulas as described hereinafter.

[Chemical formula 4]

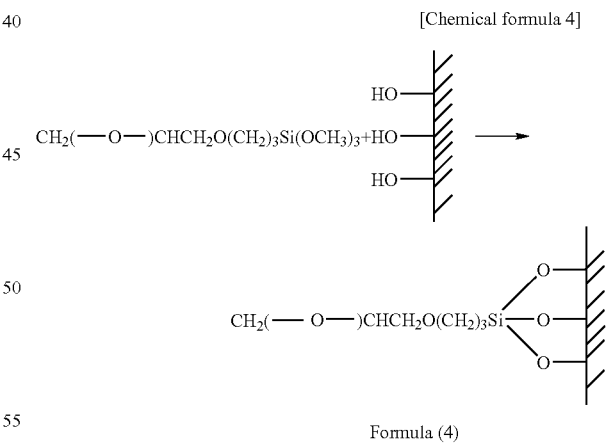

Formula (4)

Next, an acidic group was introduced into the organic molecule immobilized by a covalent bond on the surface of the base material. Here, a sulfonic acid group was introduced as the acidic group. The introduction of the sulfonic acid group was performed according to the following procedure.

To 15 ml of water, was dissolved 0.4 g of sodium sulfite to obtain a solution, and then 1 g of the titania particulates on whose surface the organic molecule was immobilized was immersed in the solution to allow them to react at 70° C. for 2 hours. As a result, the sulfonic acid group was introduced into the organic molecule immobilized on the surface of the base material, obtaining the titania particulates on whose surface the acidic substance is immobilized as represented by formula (5).

[Chemical formula 5]

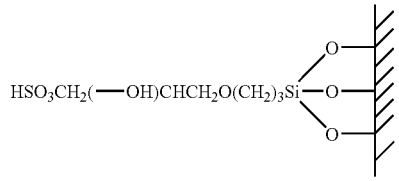

Formula (5)

Next, the titania particulates on whose surface the acidic substance is immobilized were dispersed in a basic polymer according to the following procedure to obtain a proton conductor.

First, polybenzimidazole which is a basic polymer was dissolved in dimethylacetamide to obtain a solution of 20% by weight. Into 7.5 g of the resulting polymer solution, was charged 0.9 of the titania particulates on whose surface the acidic substance is immobilized, followed by ultrasonic dispersion in the solution.

The resulting dispersion was cast on a glass plate with a knife coater, and was dried to obtain a membrane. The resulting membrane was heated at 140° C. for 10 minutes, and then peeled off the glass plate and vacuum dried at 90° C. to obtain a proton conductor membrane 1.

EXAMPLE 2

A proton conductor was obtained by using the same titania particulates as in Example 1 (an average particle size of 30 nm, a specific surface area of 50 m$^2$/g) as a base material, immobilizing an organic molecule having a sulfonic acid group, which has a different molecular structure from the one in Example 1, by a covalent bond on the surface of the base material, and then dispersing the base material in a basic polymer. The procedure will be shown below.

First, 0.2 g of a chlorosilane compound ($CH_2$=CH—$C_6H_4$—$(CH_2)_3SiCl_3$) containing a benzene ring in the molecule was dissolved in 10 ml of a toluene solvent to obtain a solution, and then 1 g of the titania particulates was immersed in the solution to allow them to react at room temperature for 2 hours.

In this process, dehydrochlorination reaction occurred between the hydroxy groups (—OH) at the surface of the base material and chloro groups of the chlorosilane compound, forming a membrane composed of the organic molecule covalently bonded to the surface of the base material. It is likely that the dehydrochlorination reaction proceeded as represented by the following formula (6).

[Chemical formula 6]

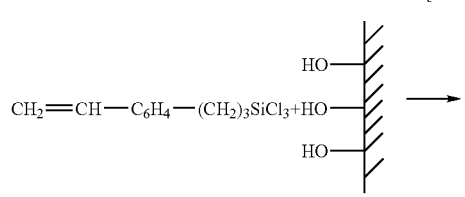

-continued

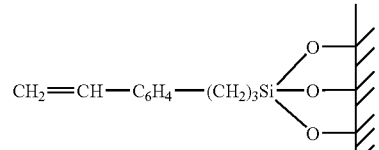

Formula (6)

Next, an acidic group was introduced into the organic molecule immobilized by a covalent bond on the surface of the base material. Here, a sulfonic acid group was introduced as the acidic group. The introduction of the acidic group was performed according to the following procedure.

A solution was obtained by mixing 1 ml of chlorosulfuric acid and 10 ml of chloroform. To the resulting solution, was immersed 1 g of the titania particulates on whose surface the organic molecule was immobilized to allow them to react at 40° C. for 4 hours. As a result, the sulfonic acid group was introduced into the organic molecule immobilized on the surface of the base material, obtaining the titania particulates on whose surface the acidic substance is immobilized as represented by formula (7). These particulates were dispersed in a basic polymer according to the procedure similar to that in Example 1 to obtain a proton conductor membrane 2.

[Chemical formula 7]

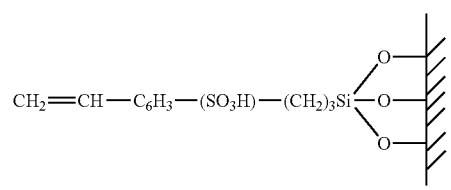

Formula (7)

EXAMPLE 3

A proton conductor was obtained by building up organic molecules having a sulfonic acid group on a surface of a base material to immobilize the organic molecules, and then dispersing the base material in a basic polymer. The procedure will be shown below. First, in a manner similar to Example 2, hydroxy groups on a surface of titania particulates (an average particle size of 30 nm, a specific surface area of 50 m$^2$/g) were allowed to react with a chlorosilane compound ($CH_2$=CH—$C_6H_4$—$(CH_2)_3SiCl_3$) to immobilize a first organic molecule on the surface of the base material as shown in formula (6).

Next, a second organic molecule was introduced into the first organic molecule immobilized on the surface of the base material according to the following procedure.

First, 0.2 g of the second organic molecule ($CF_3CF_2$—$C_6H_4$—$(CH_2)_2Br$) and 0.01 g of azobisisobutyronitrile (AIBN) as a catalyst were dissolved in 10 ml of a toluene solvent to obtain a solution, and then the titania particulates on which the first organic molecule is immobilized were immersed in the resulting solution to allow them to react at 60° C. for 2 hours. In this process, the second organic molecule was allowed to react with the first organic molecule, resulting in immobilization of the built-up organic molecule as represented by formula (8) on the surface of the base material.

[Chemical formula 8]

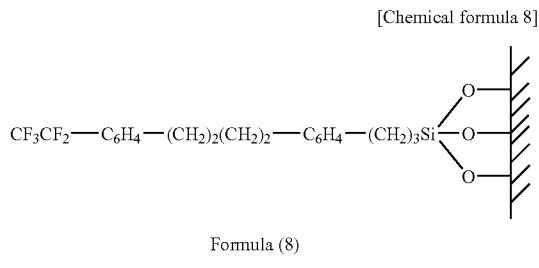

Formula (8)

Next, an acidic group was introduced into the built-up organic molecule immobilized by a covalent bond on the surface of the base material. Here, a sulfonic acid group was introduced as the acidic group. The introduction of the sulfonic acid group was performed according to the procedure similar to that in Example 2. As a result, as represented by formula (9), a built-up organic molecule having two sulfonic acid groups was immobilized on the surface of the titania particulates. These particulates were dispersed in a basic polymer according to the procedure similar to that in Example 1 to obtain a proton conductor membrane 3.

[Chemical formula 9]

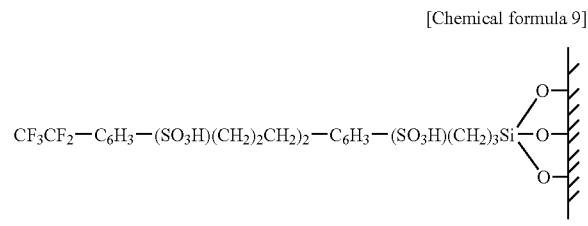

Formula (9)

EXAMPLE 4

A proton conductor was obtained by immobilizing organic molecules having a sulfonic acid group on a surface of a base material, and then dispersing the base material in a basic polymer. The procedure will be shown below.

First, in a manner similar to Example 2, hydroxy groups on a surface of titania particulates (an average particle size of 30 nm, a specific surface area of 50 m$^2$/g) were allowed to react with a chlorosilane compound (CH$_2$=CH—C$_6$H$_4$—(CH$_2$)$_3$SiCl$_3$) to immobilize a first organic molecule on the surface of the base material as shown in formula (6).

Next, an organic molecule was introduced into the first organic molecule immobilized on the surface of the base material according to the following procedure.

First, 3 g of sodium 2-acrylamido-2-methylpropane sulfonate which is an organic molecule having a polymerizable functional group and 0.01 g of azobisisobutyronitrile (AIBN) as a catalyst were dissolved in 10 ml of deionized water to obtain a solution, and then the titania particulates on which the first organic molecule is immobilized were immersed in the solution to allow them to react at 60° C. for 4 hours. In this process, polymerization of the organic molecule having a polymerizable functional group proceeded using the first organic molecule as a starting point, resulting in immobilization of a polymer having a sulfonate group on the surface of the base material.

The titania particulates on which the polymer having a sulfonate group is immobilized was immersed in aqueous hydrochloric acid at a concentration of 1 mol/L for one hour to protonate the sulfonate group to convert it to a sulfonic acid group. The thus obtained titania particulates on whose surface an acidic substance is immobilized were dispersed in a basic polymer according to the procedure similar to that in Example 1 to obtain a proton conductor membrane 4.

EXAMPLE 5

A proton conductor was obtained by using organic particulates as a base material, immobilizing an organic polymer having a sulfonic acid group by a covalent bond on the surface of the base material, and then dispersing the base material in a basic polymer. The procedure will be shown below.

Polystyrene particulates (an average particle size of 5 μm) were used as the organic particulates. The polystyrene particulates were subjected to plasma treatment (a power of 50W, a pressure of 1 Pa, a time period of 30 seconds) in an argon environment to form radical active sites on the surface. Subsequently, the following polymerization was carried out in an argon environment.

First, 3 g of sodium 2-acrylamido-2-methylpropane sulfonate which is an organic molecule having a polymerizable functional group was dissolved in 10 ml of deionized water to obtain a solution, and then the polystyrene particulates after the plasma treatment were immersed in the solution to allow them to react at 60° C. for 4 hours. In this process, polymerization of the organic molecule having a polymerizable functional group proceeded using the radical active site of the polystyrene particulates as a starting point, resulting in immobilization of a polymer having a sulfonate group on the surface of the base material.

The polystyrene particulates on which the polymer having a sulfonate group is immobilized were immersed in aqueous hydrochloric acid at a concentration of 1 mol/L for one hour to protonate the sulfonate group to convert it to sulfonic acid. The thus obtained polystyrene particulates on whose surface an acidic substance is immobilized were dispersed in a basic polymer according to the procedure similar to that in Example 1 to obtain a proton conductor membrane 5.

EXAMPLE 6

A proton conductor was obtained by mixing a base material on whose surface an organic molecule having a sulfonic acid group is immobilized by a covalent bond and a base material on whose surface an organic molecule having a basic group is immobilized by a covalent bond. The procedure will be shown below.

As the base material on whose surface an organic molecule having a sulfonic acid group is immobilized by a covalent bond, the same one as in Example 1 (that is, titania particulates on which an acidic substance represented by the formula (5) is immobilized) was prepared.

The base material on whose surface an organic molecule having a basic group is immobilized by a covalent bond was prepared according to the following procedure. Inorganic particulates similar to those in Example 1, that is, titania particulates (an average particle size of 30 nm, a specific surface area of 50 m$^2$/g) were used as the base material.

First, 0.2 g of an alkoxysilane compound (H$_2$N—(CH$_2$)$_2$—NH—(CH$_2$)$_2$—NH—(CH$_2$)$_3$—Si—(OMe)$_3$) containing an amine group in the molecule was dissolved in 10 ml of a toluene solvent to obtain a solution, and then 1 g of the titania particulates was immersed in the solution to allow them to react at 70° C. for 2 hours. In this process, dealcoholization reaction occurred between the hydroxy groups (—OH) at the surface of the base material and alkoxy groups of the alkoxysilane compound, immobilizing a basic substance by a covalent bond on the surface of the base material. It is likely that the dealcoholization reaction proceeded as represented by the following formula (10).

wall surface of the pores) in a manner similar to Example 1 except that 1 g of the silica gel was used as a base material.

Next, a basic molecule was introduced into the silica gel in which the acidic substance is immobilized in the pores thereof in the following manner. First, 1 g of benzimidazole which is a basic molecule was dissolved in 20 ml of ethanol to obtain a solution, and 1 g of the silica gel in which the acidic substance is immobilized in the pores thereof was immersed in the solution and stirred. Then, the resulting dispersion was

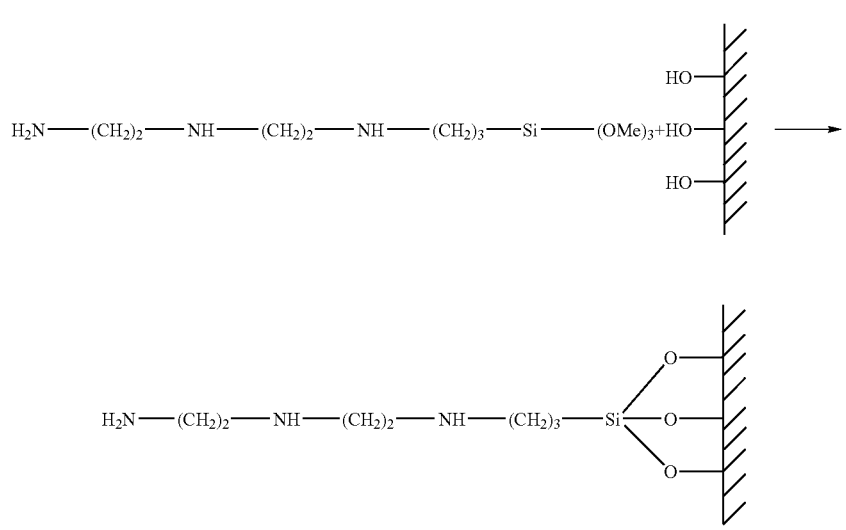

[Chemical formula 10]

Formula (10)

Next, the titania particulates on whose surface the acidic substance is immobilized and the titania particulates on whose surface the basic substance is immobilized were combined according to the following procedure to obtain a proton conductor.

Into 20 ml of a solvent obtained by mixing acetone and water in a weight ratio of 1:1, were charged 0.9 g of the titania particulates on whose surface the acidic substance is immobilized and 0.4 g of the titania particulates on whose surface the basic substance is immobilized, followed by ultrasonic dispersion in the solution. The dispersion was vacuum filtered with a membrane filter and dried on the filter to obtain a proton conductor. The obtained proton conductor was formed to a sheet at a pressure of 50 kgf/cm$^2$. The obtained sheet was heated at 140° C. for 10 minutes and then vacuum dried at 90° C. to obtain a proton conductor membrane 6.

EXAMPLE 7

A proton conductor was obtained by using a silica gel (an average particle size of 2 μm, a specific surface area of 300 m$^2$/g) as a base material, immobilizing an organic molecule having a sulfonic acid group by a covalent bond in the pores of the silica gel, coupling a basic molecule to a sulfonic acid group by acid-base bonding and then dispersing the base material in a basic polymer. The procedure will be shown below.

First, the organic molecule having a sulfonic acid group (that is, the acidic substance represented by the formula (5)) was immobilized on the surface of the base material (inner vacuum filtered with a membrane filter and dried on the filter to obtain a proton conductor. The obtained proton conductor was dispersed in a basic polymer according to the procedure similar to that in Example 1 to obtain a proton conductor 7.

EXAMPLE 8

A proton conductor was obtained by using porous glass having through-holes in the thickness direction (an average pore size of 4 nm, a specific surface area of 200 m$^2$/g, a thickness of 0.5 mm) as a base material, immobilizing an organic molecule having a sulfonic acid group by a covalent bond on the inner wall surface of the through-holes, and coupling a basic molecule to the sulfonic acid group by acid-base bonding.

First, the organic molecule having a sulfonic acid group (that is, the acidic substance represented by the formula (5)) was immobilized on the surface of the base material (inner wall surface of the through-holes) in a manner similar to Example 1 except that 1 g of the porous glass was used as a base material.

Next, a basic molecule was introduced into the porous glass in which the acidic substance is immobilized in the through-holes thereof in the following manner. First, 1 g of benzimidazole which is a basic molecule was dissolved in 20 ml of ethanol to obtain a solution, and 1 g of the porous glass in which the acidic substance is immobilized in the through-holes thereof was immersed in the solution. Then, the porous glass was removed from the solution, dried, heated at 140° C.

for 10 minutes and then vacuum dried at 90° C. to obtain a proton conductor membrane 8.

EXAMPLE 9

A proton conductor was obtained by using porous glass having through-holes in the thickness direction (an average pore size of 100 nm, a specific surface area of 10 m²/g, a thickness of 0.5 mm) as a base material, immobilizing an acidic hydroxy group by a covalent bond on the inner wall surface of the through-holes, and coupling a basic molecule to the hydroxy group by acid-base bonding.

First, the base material was subjected to water-vapor plasma treatment in order to introduce a hydroxy group into the surface of the base material (inner wall surface of the through-holes). Specifically, the water-vapor plasma treatment was performed by disposing 0.5 g of the porous glass in a vacuum container (a pressure of 0.10 Torr), introducing water vapor into the container at a flow rate of 100 ml/min together with an argon carrier gas, and applying high-frequency voltage (an output of 100 W) for 10 minutes. The introduction of the hydroxy group into the surface of the base material was verified by an increase in the absorption at 3560 cm$^{-1}$ in the infrared absorption spectrum.

Next, a basic molecule was introduced into the porous glass in which the acidic hydroxy group is immobilized in the through-holes thereof in the following manner. First, 10 g of benzimidazole which is a basic molecule was put in a beaker, heated and melted to obtain a melt, in which the porous glass was immersed to impregnate the melt into the thorough-holes. Then, the porous glass was removed from the melt and dried at ordinary temperature to obtain a proton conductor membrane 9.

EXAMPLE 10

A proton conductor was obtained by using porous glass having through-holes in the thickness direction (an average pore size of 100 nm, a specific surface area of 10 m²/g, a thickness of 0.5 mm) as a base material, immobilizing an organic molecule having a phosphoric acid group by a covalent bond on the inner wall surface of the through-holes, and coupling a basic molecule to the phosphoric acid group by acid-base bonding.

First, 0.5 g of the porous glass was subjected to water-vapor plasma treatment similar to that in Example 9 in order to introduce a hydroxy group into the surface of the base material (inner wall surface of the through-holes). The introduction of the hydroxy group into the surface of the base material was verified by an increase in the absorption at 3560 cm$^{-1}$ in the infrared absorption spectrum.

Next, 0.2 g of an alkoxysilane compound ((EtO)$_2$—P(=O)—(CH$_2$)$_8$—Si—(OMe)$_3$) containing an ethoxy phosphate group in the molecule was dissolved in 10 ml of a toluene solvent to obtain a solution, and then 0.5 g of the porous glass having a hydroxy group introduced therein was immersed in the solution to allow them to react at 70° C. for 2 hours. In this process, dealcoholization reaction occurred between the hydroxy groups (—OH) at the surface of the base material and alkoxy groups of the alkoxysilane compound, immobilizing an organic substance containing an ethoxy phosphate group on the surface of the base material. It is likely that the dealcoholization reaction proceeded as represented by the following formula (11).

[Chemical formula 11]

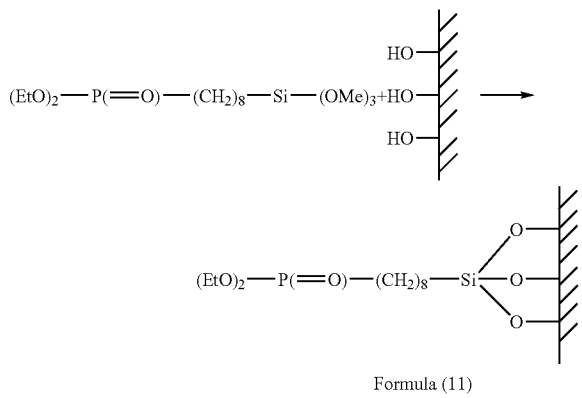

Formula (11)

The resulting porous glass was immersed in aqueous hydrochloric acid at a concentration of 3% by weight to convert an ethoxy phosphate group to a phosphoric acid group by hydrolysis. Thus, porous glass in which acidic substance is immobilized in through-holes as represented by formula (12) was obtained. Into the porous glass, was introduced imidazole which is a basic substance by the procedure similar to that in Example 9 to obtain a proton conductor membrane 10.

[Chemical formula 12]

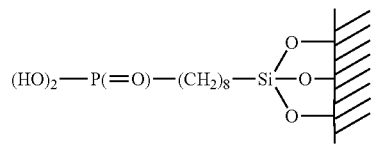

Formula (12)

EXAMPLE 11

A proton conductor was obtained by using porous glass having through-holes in the thickness direction (an average pore size of 100 nm, a specific surface area of 10 m²/g, a thickness of 0.5 mm) as a base material, immobilizing an organic polymer having a phosphoric acid group by a covalent bond on the inner wall surface of the through-holes, and coupling a basic molecule to the phosphoric acid group by acid-base bonding.

First, 0.5 g of the porous glass was subjected to water-vapor plasma treatment similar to that in Example 9 in order to introduce a hydroxy group into the surface of the base material (inner wall surface of the through-holes). The introduction of the hydroxy group into the surface of the base material was verified by an increase in the absorption at 3560 cm$^{-1}$ in the infrared absorption spectrum.

Next, the organic molecule having a polymerizable functional group (that is, the organic molecule represented by the formula (6)) was immobilized on the surface of the base material (inner wall surface of the through-holes) in a manner similar to Example 2 except that 1 g of the porous glass in which a hydroxy group is introduced was used as a base material.

Next, an organic polymer having a polymerizable functional group and a phosphoric acid group was introduced into the organic molecule represented by the formula (6) immobilized in the through-holes by the following procedure.

First, 1 g of the organic molecule containing a phosphoric acid group ($CH_2=CH-P(=O)-(OH)_2$) and 0.05 g of azobisisobutyronitrile (AIBN) as a catalyst were dissolved in 10 ml of an ethanol solvent to obtain a solution, and then the porous glass on which the organic molecule represented by the formula (6) is immobilized was immersed in the solution to allow them to react at 60° C. for 2 hours. In this process, polymerization of the organic molecule having a polymerizable group and a phosphoric acid group proceeded, resulting in immobilization of the polymer as represented by formula (13) in the through-holes. Subsequently, in a manner similar to Example 9, imidazole which is a basic substance was introduced into the base material to obtain a proton conductor membrane 11.

and then dried (step B). The structure of dodecyl phosphoric acid is represented by formula (15).

[Chemical formula 15]

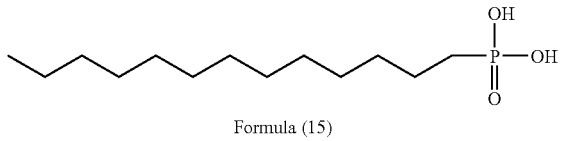

Formula (15)

Step A for immersing the base material in the basic solution and step B for immersing the base material in the acidic

[Chemical formula 13]

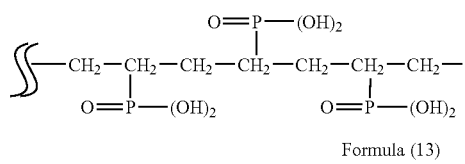

Formula (13)

EXAMPLE 12

A proton conductor was obtained by using porous glass having through-holes in the thickness direction (an average pore size of 100 nm, a specific surface area of 10 m²/g, a thickness of 0.5 mm) as a base material, immobilizing an organic molecule having a phosphoric acid group by a covalent bond on the inner wall surface of the through-holes, and building up an acidic molecule and a basic molecule by acid-base bonding.

First, 0.5 g of the porous glass was subjected to water-vapor plasma treatment similar to that in Example 9 in order to introduce a hydroxy group into the surface of the base material (inner wall surface of the through-holes). The introduction of the hydroxy group into the surface of the base material was verified by an increase in the absorption at 3560 cm$^{-1}$ in the infrared absorption spectrum.

Next, 0.2 g of undecylimidazole which is a basic substance having an imidazole group in the molecule was dissolved in 10 ml of a toluene solvent to obtain a solution, and 0.5 g of the porous glass in which a hydroxy group is introduced was immersed in the solution at room temperature for one hour and then dried (step A). The structure of undecylimidazole is represented by formula (14).

[Chemical formula 14]

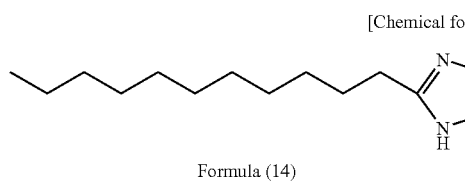

Formula (14)

Subsequently, 0.2 g of dodecyl phosphoric acid which is an acidic substance having a phosphoric acid group in the molecule was dissolved in 10 ml of water to obtain a solution, in which 0.5 g of the porous glass in which undecylimidazole is introduced was immersed at room temperature for one hour solution, as described above, were alternately repeated 25 times each to form a built-up film in which the acidic molecules and the basic molecules were laminated alternately in the through-holes to obtain a proton conductor membrane 12.

EXAMPLE 13

A non-conductive substance was filled in the space in the through-holes of the proton conductive membrane 12 obtained in Example 12 in the following manner. Specifically, 0.5 g of azobisisobutyronitrile (AIBN) as a catalyst was dissolved in 10 g of styrene ($CH_2=CH-C_6H_5$) to obtain a solution, in which the proton conductor membrane 12 was immersed and allowed to react at 40° C. for 4 hours to obtain a proton conductive membrane 13. In this process, the space remaining in the through-holes was clogged with non-electron conductive polystyrene chains.

COMPARATIVE EXAMPLE 1

Nafion 117 (registered trade mark) manufactured by EI du Pont de Nemours and Company which is a polymer electrolyte membrane was provided as a proton conductor membrane A for comparison. Nafion 117 is a membrane formed from perfluorocarbon sulfonic acid.

Evaluation 1

Ion conductivity of proton conductor membranes 1 to 13 of Examples and a proton conductor membrane A of Comparative Example were evaluated. Evaluation of ion conductivity was performed by measuring alternating-current impedance under the condition that a proton conductor membrane which is a sample was sandwiched by two gold electrodes and measured for the impedance in a constant temperature oven of 120° C. under a nitrogen gas flow to produce a relative humidity of 20%. The results are shown in Table 1.

TABLE 1

| Example number | Proton conductor membrane | Ion conductivity (S/cm) |
|---|---|---|
| Example 1 | Proton conductor membrane 1 | $3.8 \times 10^{-3}$ |
| Example 2 | Proton conductor membrane 2 | $4.6 \times 10^{-3}$ |
| Example 3 | Proton conductor membrane 3 | $7.5 \times 10^{-3}$ |
| Example 4 | Proton conductor membrane 4 | $5.7 \times 10^{-2}$ |
| Example 5 | Proton conductor membrane 5 | $1.1 \times 10^{-3}$ |
| Example 6 | Proton conductor membrane 6 | $4.2 \times 10^{-3}$ |
| Example 7 | Proton conductor membrane 7 | $8.2 \times 10^{-3}$ |
| Example 8 | Proton conductor membrane 8 | $2.2 \times 10^{-3}$ |
| Example 9 | Proton conductor membrane 9 | $5.1 \times 10^{-3}$ |
| Example 10 | Proton conductor membrane 10 | $6.5 \times 10^{-3}$ |
| Example 11 | Proton conductor membrane 11 | $8.2 \times 10^{-2}$ |
| Example 12 | Proton conductor membrane 12 | $7.8 \times 10^{-2}$ |
| Example 13 | Proton conductor membrane 13 | $7.6 \times 10^{-2}$ |
| Comp. Ex. 1 | Proton conductor membrane A | $9.7 \times 10^{-4}$ |

As shown in Table 1, the proton conductor membranes 1 to 13 had better ion conductivity than the proton conductor membrane A. That is, in the proton conductor membranes of Examples, the ion-conducting path has been kept even under the environment of a temperature of 120° C. and a relative humidity of 20%. It is likely that, in the proton conductor membranes 1 to 13, acid-base bonding is maintained even in a temperature range of 100° C. or more, and at least one of an acidic and basic substances is firmly immobilized by a covalent bond on a surface of a base material.

EXAMPLE 14

The proton conductor membranes 1 to 13 prepared in Examples 1 to 13 were used as the electrolyte membrane to manufacture fuel cells 1 to 13, respectively, for evaluating power generation characteristics thereof. The proton conductor membranes 1 to 13 were used for fuel cells after adjusting the thickness thereof to about 50 μm. Adjustment of the membrane thickness was performed by cutting or the like.

The fuel cells 1 to 13 were manufactured by the following procedure.

First, an anode and a cathode were mounted on both surfaces of a proton conductor membrane to prepare a membrane electrode assembly (MEA). The MEA was sandwiched by a pair of conductive carbon separators. Grooves to be used as fuel channels were formed on the surface opposing the anode of the separator mounted on the anode side, and grooves to be used as air channels were formed on the surface opposing the cathode of the separator mounted on the cathode side. An electrode on which a Pt—Ru catalyst is carried (a carried amount of Pt of 1 mg/cm$^2$, manufactured by Electrochem Inc.) was used as the anode, and an electrode on which a Pt catalyst is carried (a carried amount of Pt of 1 mg/cm$^2$, manufactured by Electrochem Inc.) was used as the cathode. Incidentally, the area of the power generation region in the MEA was 1 cm$^2$.

COMPARATIVE EXAMPLE 2

Nafion 112 (registered trade mark)(a thickness of 50 μm) manufactured by EI du Pont de Nemours and Company which is a polymer electrolyte membrane was used as the electrolyte membrane to manufacture a fuel cell A for comparison by the procedure similar to that in Example 14. Nafion 112 is a membrane formed from perfluorocarbon sulfonic acid.

Evaluation 2

Power generation test was performed for the fuel cells 1 to 13 of Examples and the fuel cell A of Comparative Example using hydrogen gas as a fuel. The following power generation conditions were used.

Fuel: feed rate 30 ml/min, gas temperature 80° C., gas relative humidity 100%
Air: feed rate 200 ml/min, gas temperature 75° C., gas relative humidity 100%
Cell temperature: 120° C.
First evaluation item: open circuit voltage (OCV)
Second evaluation item: cell voltage (V) at a current density of 0.1 A/cm$^2$
The results are shown in Table 2.

TABLE 2

| Example number | Fuel cell | OCV (V) | Cell Voltage during power generation (V) |
|---|---|---|---|
| Example 14 | Fuel cell 1 | 0.96 | 0.56 |
| | Fuel cell 2 | 0.96 | 0.58 |
| | Fuel cell 3 | 0.97 | 0.65 |
| | Fuel cell 4 | 0.96 | 0.70 |
| | Fuel cell 5 | 0.98 | 0.23 |
| | Fuel cell 6 | 0.97 | 0.59 |
| | Fuel cell 7 | 0.97 | 0.65 |
| | Fuel cell 8 | 0.96 | 0.43 |
| | Fuel cell 9 | 0.92 | 0.21 |
| | Fuel cell 10 | 0.92 | 0.64 |
| | Fuel cell 11 | 0.95 | 0.70 |
| | Fuel cell 12 | 0.94 | 0.71 |
| | Fuel cell 13 | 1.02 | 0.72 |
| Comp. Ex. 2 | Fuel cell A | 0.95 | 0.16 |

As shown in Table 2, all of the fuel cells 1 to 13 were able to perform power generation and had a higher cell voltage during power generation than the fuel cell A, exhibiting high output. The proton conductor membranes 1 to 13 used as the electrolyte membrane probably have better proton conductivity than Nafion 112 under the above conditions.

The fuel cell 13 exhibited the highest open circuit voltage (OCV). Permeability to the fuel gas and air of the proton conductor membrane was probably suppressed by filling a non-electron conductive substance into the space in the through-holes of the proton conductor membrane.

EXAMPLE 15

The proton conductor described in Example 1 was used to manufacture the electrode of a fuel cell in the following manner.

First, titania particulates on whose surface an acidic substance is immobilized were prepared by the procedure similar to Example 1. The titania particulates, catalyst particles and a binder were mixed in a weight ratio of 1:1:0.5, respectively, to obtain a catalyst composition.

Carbon particles carrying a platinum catalyst was used as the catalyst particles. As the carbon particles, was used Ketjen Black EC (manufactured by Akzo Chemie Company of The Netherlands) having an average primary particle size of 30 nm, on which was carried the platinum catalyst having an average particle size of 3 nm. The amount of platinum contained in the catalyst particles was 50% by weight. As the binder, was used Nafion (registered trade mark) manufactured by EI du Pont de Nemours and Company. Nafion was used by dissolving it in a mixed solvent of ethanol and isopropanol.

The catalyst composition was coated on carbon paper having a thickness of 360 μm (manufactured by Toray Industries, Inc.) with a coater having a gap of 50 μm and vacuum dried. Subsequently, the carbon paper carrying a coating film of the catalyst composition was immersed in a dimethylacetamide solution containing polybenzimidazole which is a basic substance in an amount of 2% by weight. In this process, the polybenzimidazole which is a basic substance was introduced into the titania particulates contained in the coating film of the catalyst composition to produce a proton conductor. Thus, a catalyst layer containing the proton conductor, the catalyst particles and the binder was formed. Then, the carbon paper carrying the catalyst layer was heated at 140° C. for 20 minutes and vacuum dried at 90° C. to obtain an electrode. The obtained electrode was used as an anode and a cathode, and the proton conductor of Example 13 (a thickness of about 50 μm) was used as an electrolyte membrane to manufacture a fuel cell X by the procedure similar to that in Example 14.

EXAMPLE 16

The proton conductor described in Example 6 was used to manufacture the electrode of a fuel cell in the following manner.

First, titania particulates on whose surface an acidic substance is immobilized (particulates A) and titania particulates on whose surface a basic substance is immobilized (particulates B) were prepared by the procedure similar to Example 6. The particulates A, the particulates B, catalyst particles and a binder were mixed in a weight ratio of 1:0.5:1:1, respectively, to obtain a catalyst composition. As the catalyst particles and the binder, the same as those in Example 15 were used.

The catalyst composition was coated on carbon paper having a thickness of 360 μm (manufactured by Toray Industries, Inc.) with a coater having a gap of 50 μm and vacuum dried at 90° C. to form a catalyst layer. The thus obtained electrode was used as an anode and a cathode, and the proton conductor of Example 13 (a thickness of about 50 μm) was used as an electrolyte membrane to manufacture a fuel cell Y by the procedure similar to that in Example 14.

EXAMPLE 17

The proton conductor described in Example 8 was used to manufacture the electrode of a fuel cell in the following manner.

A proton conductor was prepared by the procedure similar to Example 8, and it was ground to a powder having an average particle size of 30 μm using a glass cutter and a mortar. The ground ion conductor, catalyst particles and a binder were mixed in a weight ratio of 1:1:1, respectively, to obtain a catalyst composition. As the catalyst particles and the binder, the same as those in Example 15 were used.

The catalyst composition was coated on carbon paper having a thickness of 360 μm (manufactured by Toray Industries, Inc.) with a coater having a gap of 50 μm and vacuum dried at 90° C. to form a catalyst layer. The thus obtained electrode was used as an anode and a cathode, and the proton conductor of Example 13 (a thickness of about 50 μm) was used as an electrolyte membrane to manufacture a fuel cell Z by the procedure similar to that in Example 14.

COMPARATIVE EXAMPLE 3

An electrode which does not contain the proton conductor of the present invention was manufactured for comparison purposes. That is, catalyst particles and a binder were mixed in a weight ratio of 1:1 to obtain a catalyst composition. As the catalyst particles and the binder, the same as those in Example 15 were used.

The catalyst composition was coated on carbon paper having a thickness of 360 μm (manufactured by Toray Industries, Inc.) with a coater having a gap of 50 μm and vacuum dried at 90° C. to form a catalyst layer. The thus obtained electrode was used as an anode and a cathode, and the proton conductor of Example 13 (a thickness of about 50 μm) was used as an electrolyte membrane to manufacture a fuel cell C by the procedure similar to that in Example 14.

Evaluation 3

Power generation test was performed for the fuel cells X, Y and Z of Examples and the fuel cell C of Comparative Example using hydrogen gas as a fuel. The following power generation conditions were used.

Fuel: feed rate 30 ml/min, gas temperature 80° C., gas relative humidity 0%
Air: feed rate 200 ml/min, gas temperature 75° C., gas relative humidity 0%
Cell temperature: 120° C.
First evaluation item: open circuit voltage (OCV)
Second evaluation item: cell voltage (V) at a current density of 0.1 A/cm$^2$
The results are shown in Table 2.

TABLE 3

| Example number | Fuel cell | OCV (V) | Cell Voltage during power generation (V) |
|---|---|---|---|
| Example 15 | Fuel cell X | 1.04 | 0.76 |
| Example 16 | Fuel cell Y | 1.03 | 0.58 |
| Example 17 | Fuel cell Z | 1.03 | 0.64 |
| Comp. Ex. 3 | Fuel cell C | 1.02 | 0 |

As shown in Table 3, the fuel cell C was able to provide open circuit voltage, but was not able to perform power generation at a current density of 0.1 A/cm$^2$. On the other hand, all of the fuel cells X to Z were able to perform power generation and had high voltage during power generation, exhibiting excellent power generation characteristics. Since the fuel cells X to Z and the fuel cell C all employ the same electrolyte membrane, the difference of the power generation characteristics is probably due to the difference of the electrode characteristics. That is, the electrodes of the fuel cells X to Z exhibit good electrode characteristics even in a high temperature and low humidity environment as described above. This is probably due to high ion conductivity exhibited by the ion conductor in these electrodes even in a high temperature and low humidity environment.

INDUSTRIAL APPLICABILITY

The present invention provides a proton conductor which develops good ion conductivity stably in a high temperature range even under low humidity. The proton conductor can be applied, but not limited, to fuel cells and other various electrochemical devices such as primary batteries, secondary batteries, electrochemical capacitors, various gas sensors and electrochromic devices.

The invention claimed is:

1. A proton conductor comprising a base material, an acidic substance and a basic substance,
   wherein the acidic substance has protons,
   at least part of the protons are dissociated by the basic substance,
   the base material has no electron conductivity,
   the base material comprises particles on which the acidic substance or the basic substance is immobilized,
   the particles are dispersed in the acidic substance or the basic substance, and
   when the acidic substance is immobilized on the particles, the particles are dispersed in the basic substance, and when the basic substance is immobilized on the particles, the particles are dispersed in the acidic substance.

2. The proton conductor according to claim 1, wherein at least part of the at least one of the acidic substance and the basic substance is a polymer, and the base material is retained in a matrix of the polymer.

3. A proton conductor comprising a particulate base material having an acidic substance immobilized on a surface thereof, and a particulate base material having a basic substance immobilized on a surface thereof,
   wherein the acidic substance has protons; and
   at least part of the protons are dissociated by the basic substance.

4. A proton conductor comprising a base material, an acidic substance and a basic substance,
   wherein the acidic substance has protons;
   at least part of the protons are dissociated by the basic substance; and
   the base material is a porous body having pores or through-holes, and one of the acidic substance and the basic substance is immobilized on an inner wall of the pores or the through-holes of the porous body to form a first layer, and the other of the acidic substance and the basic substance is immobilized on the first layer by acid-base bond to form a second layer.

5. The proton conductor according to claim 4, wherein the at least one of the acidic substance and the basic substance is an organic compound having a hydrophilic part and a hydrophobic part in the molecule.

6. The proton conductor according to claim 5, wherein the organic compound forms a built-up film in the pores or through-holes.

7. The proton conductor according to claim 4, further comprising a non-electron conductive substance, wherein the non-electron conductive substance clogs at least part of the pores.

8. The proton conductor according to claim 4, wherein the porous body has at least the through-holes.

9. The proton conductor according to claim 3, wherein the base material is composed of an inorganic substance.

10. An electrolyte membrane comprising the proton conductor according to claim 3.

11. An electrode comprising the proton conductor according to claim 3.

12. A fuel cell comprising an anode, a cathode and an electrolyte membrane interposed therebetween, wherein the electrolyte membrane is the electrolyte membrane according to claim 10.

13. A fuel cell comprising an anode, a cathode and an electrolyte membrane interposed therebetween, wherein at least one of the anode and the cathode is the electrode according to claim 11.

14. The proton conductor according to claim 4, wherein the base material is composed of an inorganic substance.

15. An electrolyte membrane comprising the proton conductor according to claim 4.

16. An electrode comprising the proton conductor according to claim 4.

17. A fuel cell comprising an anode, a cathode and an electrolyte membrane interposed therebetween, wherein the electrolyte membrane is the electrolyte membrane according to claim 15.

18. A fuel cell comprising an anode, a cathode and an electrolyte membrane interposed therebetween, wherein at least one of the anode and the cathode is the electrode according to claim 16.

* * * * *